(12) United States Patent
Drogui et al.

(10) Patent No.: US 9,199,200 B2
(45) Date of Patent: Dec. 1, 2015

(54) SUBMERGED MEMBRANE BIOREACTOR SYSTEM AND BIOLOGICAL METHODS FOR REMOVING BISPHENOL COMPOUNDS FROM MUNICIPAL WASTEWATER

(75) Inventors: Patrick Drogui, Québec (CA); Brahima Seyhi, Québec (CA); Gerardo Buelna, Québec (CA); Jean-François Blais, Baudrier (CA)

(73) Assignees: Centre de Recherche Industrielle de Québec (CRIQ), Québec (CA); Institut National de la Recherche Scientifique (INRS), Québec (CA)

(*) Notice: Subject to any disclaimer, the term of this patent is extended or adjusted under 35 U.S.C. 154(b) by 857 days.

(21) Appl. No.: 13/171,902

(22) Filed: Jun. 29, 2011

(65) Prior Publication Data

US 2011/0315629 A1  Dec. 29, 2011

Related U.S. Application Data

(60) Provisional application No. 61/359,918, filed on Jun. 29, 2010, provisional application No. 61/387,602, filed on Sep. 29, 2010, provisional application No. 61/433,697, filed on Jan. 18, 2011.

(51) Int. Cl.
| | |
|---|---|
| C02F 3/00 | (2006.01) |
| B01D 61/14 | (2006.01) |
| B01D 61/18 | (2006.01) |
| C02F 3/12 | (2006.01) |
| C02F 101/34 | (2006.01) |

(52) U.S. Cl.
CPC .............. *B01D 61/145* (2013.01); *B01D 61/18* (2013.01); *C02F 3/1273* (2013.01); *B01D 2315/06* (2013.01); *B01D 2315/20* (2013.01); *C02F 2101/345* (2013.01); *Y02W 10/15* (2015.05)

(58) Field of Classification Search
USPC ........................... 201/610, 614, 909; 210/620
See application file for complete search history.

(56) References Cited

U.S. PATENT DOCUMENTS

| | | | | |
|---|---|---|---|---|
| 4,352,886 | A * | 10/1982 | Pillis et al. ..................... | 435/262 |
| 4,556,638 | A * | 12/1985 | Pillis et al. ................. | 435/253.3 |
| 8,173,020 | B2 * | 5/2012 | Bowman ........................ | 210/620 |
| 2001/0027951 | A1 * | 10/2001 | Gungerich et al. ........... | 210/636 |
| 2003/0203183 | A1 * | 10/2003 | Hester et al. ................ | 428/315.5 |
| 2006/0113242 | A1 * | 6/2006 | Ishikawa et al. .............. | 210/601 |
| 2007/0209999 | A1 * | 9/2007 | Smith et al. ................... | 210/631 |

OTHER PUBLICATIONS

Barrios-Martinez, a., et al., "Degradation of synthetic phenol-containing wastewaters by Mbr," Journal of Membrane Science, 281 (2006) 288-296.*

(Continued)

*Primary Examiner* — Chester Barry
(74) *Attorney, Agent, or Firm* — Benoît & Côté Inc.

(57) ABSTRACT

The present document describes a process and a bioreactor for reducing a bisphenol compound content of a wastewater using a membrane bioreactor containing a biomass in a volatile suspended solid (VSS) form where the biomass in the membrane bioreactor is operating continuously to reduce bisphenol compound content when the bisphenol compound volumetric load is below 108 g m$^{-3}$ d$^{-1}$.

24 Claims, 17 Drawing Sheets

① Feed tank, raw water
③ Peristaltic pump
⑤ Oxygen probe
⑥ Hollow-fibre membrane
② ④ ⑬ ⑭ ⑯ Valve
⑦ Stirrer
⑧ pH probe
⑨ Temperature probe
⑩ Manometer
⑪ Peristaltic pump
⑫ Compressed air
⑮ Treated water tank
⑰ Air flow-meter

(56) References Cited

OTHER PUBLICATIONS

Auriol et al. "Endocrine Disrupting Compounds Removal from Wastewater, a New Challenge", Process Biochemistry, vol. 41, 2006, pp. 525-539.

Baronti et al. "Monitoring Natural and Synthetic Estrogens at Activated Sludge Sewage Treatment Plants and in a Receiving River Water", Environmental Science & Technology, vol. 34, No. 24, 2000, pp. 5059-5066.

Barrios-Martinez et al. "Degradation of synthetic phenol-containing wastewaters by MBR", Journal of Membrane Science, vol. 281, 2006, pp. 288-296.

Battistoni et al. "Full scale application of the coupled alternate cycles-membrane bioreactor (AC-MBR) process for wastewater reclamation and reuse", Water Practice & Technology, vol. 1, No. 4, 2006.

Bhattacharya et al. "Removal of Cadmium (II) by Low Cost Adsorbents", Journal of Environmental Engineering, vol. 110, No. 1, Feb. 1984, pp. 110-122.

Chen et al. "Bisphenol A Removal by a Membrane Bioreactor", Process Biochemistry, vol. 43, 2008, pp. 451-456.

Clara et al. "Adsorption of Bisphenol-A, 17β-estradiole and 17α-ethinylestradiole to Sewage Sludge" Chemosphere, vol. 56, No. 9, Sep. 2004, pp. 843-851.

Delgado et al. "Nitrification in a Hollow-Fibre Membrane Bioreactor", Desalination, vol. 146, 2002, pp. 445-449.

Desbrow et al. "Identification of Estrogenic Chemicals in STW Effluent. 1. Chemical Fractionation and in Vitro Biological Screening", Environmental Science & Technology, vol. 32, No. 11, 1998, pp. 1549-1558.

Esplugas et al. "Ozonation and advanced oxidation technologies to remove endocrine disrupting chemicals (EDCs) and pharmaceuticals and personal care products (PPCPs) in water effluents", Journal of Hazardous Materials, vol. 149, 2007, pp. 631-642.

Gao et al. "Study on the fluoride adsorption of various apatite materials in aqueous solution", Journal of Fluorine Chemistry, vol. 130, 2009, pp. 1035-1041.

Gehring et al. "Sources of Bisphenol A in Wastewater and Sewage Sludge", 2002, In: Schmitz, G H (ed.): Matter and Particle Transport in Surface and Subsurface Flow. Proceedings of the 3rd International Conference on Water Resources and Environment Research (ICWRER), Jul. 22-25, 2002.

Grasmick et al. "Bioreacteurs à membranes et traitement des eaux usées", Éditions Techniques de l'Ingénieur, Réf. W4140, 2009.

Heran et al. "Measurement of kinetic parameters in a submerged aerobic membrane bioreactor fed on acetate and operated without biomass discharge", Biochemical Engineering Journal, vol. 38, 2008, pp. 70-77.

Ho et al. "Pseudo-second order model for sorption processes", Process Biochemistry, vol. 34, 1999, pp, 451-465.

Hu et al. "Fate of Endocrine Disrupting Compounds in Membrane Bioreactor Systems", Environ. Sci. Technol., vol. 41, 2007, pp. 4097-4102.

Huang et al. "Analysis of Estrogenic Hormones in Municipal Wastewater Effluent and Surface Water Using Enzyme-Linked Immunosorbent Assay and Gas Chromatography/Tandem Mass Spectrometry", Environmental Toxicology and Chemistry, vol. 20, No. 1, 2001, pp. 133-139.

Jiang et al. "Comparison of modified montmorillonite adsorbents Part I: preparation, characterization and phenol adsorption", Chemosphere, vol. 47, 2002, pp. 711-716.

Krishnan et al. "Bisphenol-A: An Estrogenic Substance is Released from Polycarbonate Flasks during Autoclaving", The Endocrine Society, vol. 132, No. 6, 1993, pp. 2279-2286.

Kurian et al. "Biodegradation kinetics of high strength oily pet food wastewater in a membrane-coupled bioreactor (MBR)", Chemosphere, vol. 65, 2006, pp. 1204-1211.

Lagergren: "Zur theorie der sogenannten adsorption gelöster stoffe", Kungliga Svenska Vetenskapsakademiens. Handlingar, vol. 24, No. 4, 1898, pp. 1-39.

Langmuir: "The Adsorption of Gases on Plane Surfaces of Glass, Mica and Platinium", Journal of the American Chemical Society, vol. 40. No. 9, 1918, pp. 1361-1403.

Lee et al. "Bisphenol A Contamination in Canadian Municipal and industrial Wastewater and Sludge Samples", Water Qual. Res. J. Canada, vol. 35, No. 2, 2000, pp. 283-298.

Lister et al. "Endocrine Disruption:Why Is It So Complicated?", Water Qual. Res. J. Canada, 2001, vol. 36, No. 2, pp. 175-190.

Low: "Kinetics of chemisorption of gases on solids", Chemical Review, Jun. 1, 1960, vol. 60, No. 3, pp. 267-312.

Marrot et al. "Biodegradation of high phenol concentration by activated sludge in an immersed membrane bioreactor", Biochemical Engineering Journal, vol. 30, 2006, pp. 174-183.

Meesters et al. "Simultaneous Determination of 4-Nonylphenol and Bisphenol A in Sewage Sludge", Analytical Chemistry, Jul. 15, 2002, vol. 74, No. 14, pp. 3566-3574.

Oehlmann et al. "Effects of Endocrine Disruptors on Prosobranch Snails (Mollusca: Gastropoda) in the Laboratory. Part 1: Bisphenol A and Octylphenol as Xeno-Estrogens", Ecotoxicology, vol. 9, 2000, pp. 383-397.

Parco et al. "Kinetics of nitrogen removal in a MBR nutrient removal activated sludge system", Desalination, vol. 199, 2006, pp. 89-91.

Pellegrin et al. "Sequenced Aeration in a Membrane Bioreactor: Specific Nitrogen Removal Rates", The Canadian Journal of Chemical Engineering, vol. 80, Jun. 2002, pp. 386-392.

Petrovic et al. "Determination of Anionic and Nonionic Surfactants, Their Degradation Products, and Endocrine-Disrupting Compounds in Sewage Sludge by liquid Chromatography/Mass Spectrometry", Analytical Chemistry, vol. 72, No. 19, Oct. 1, 2000, pp. 4560-4567.

Schmuhl et al. "Adsorption of Cu(II) and Cr(VI) ions by chitosan: Kinetics and equilibrium studies", Water SA, vol. 27, No. 1, Jan. 2001, pp. 1-7.

Shen et al. " Development of an analytical method to determine phenolic endocrine disrupting chemicals in sewage and sludge by GC/MS", Chinese Science Bulletin, vol. 50, No. 23, Dec. 2005, pp. 2681-2687.

Shokoohi et al. "Biosorption of Iron From Aqueous Solution by Dried Biomass of Activated Sludge", Iran J. Environ. Health. Sci. Eng., vol. 6, No. 2, 2009, pp. 107-114.

Spring et al. "Removal of endocrine disrupting compounds using a membrane bioreactor and disinfection", J. Environ. Eng. Sci., vol. 6, 2007, pp. 131-137.

Suescun et al. "Dissolved oxygen control and simultaneous estimation of oxygen uptake rate in activated-sludge plants", Water Environment Research, vol. 70, No. 3, May/Jun. 1998, pp. 316-322.

Tomei et al. "Kinetics of 4-nitrophenol biodegradation in a sequencing batch reactor", Water Research vol. 37, 2003, pp. 3803-3814.

Vera et al. "Cross-flow microfiltration of biologically treated wastewater", Desalination, vol. 114, 1997, pp. 65-75.

Zhang et al. "Floc size distribution and bacterial activities in membrane separation activated sludge processes for small-scale wastewater treatment/reclamation", Wat. Sci. Tech., vol. 35, No. 6, 1997, pp. 37-44.

Zhao et al. "Sorption and degradation of bisphenol A by aerobic activated sludge", Journal of Hazardous Materials, vol. 155, 2008, pp. 305-311.

Zuehlke et al. "Long-Term Comparison of Trace Organics Removal Performances Between Conventional and Membrane Activated Sludge Processes", Water Environment Research, vol. 78, No. 13, Dec. 2006, pp. 2480-2486.

* cited by examiner

1. Feed tank, raw water
3. Peristaltic pump
5. Oxygen probe
6. Hollow-fibre membrane
2. 4. 13. 14. 16. Valve
7. Stirrer
8. pH probe
9. Temperature probe
10. Manometer
11. Peristaltic pump
12. Compressed air
15. Treated water tank
17. Air flow-meter a-Plan               b-3D

SUBMERGED MEMBRANE BIOREACTOR SYSTEM AND BIOLOGICAL METHODS FOR REMOVING BISPHENOL COMPOUNDS FROM MUNICIPAL WASTEWATER

FIELD OF THE INVENTION

The present invention relates to submerged membrane bioreactor systems and biological methods for removing bisphenol compounds from municipal wastewater.

BACKGROUND OF THE INVENTION

In recent years, the occurrence of toxic organic compounds called endocrine-disrupting compounds (EDC) in wastewater and their fate during wastewater treatment plant has become an important environmental and health issues. EDC are exogenous substances or mixtures that alter the normal function of endocrine system and, consequently, cause adverse effects on population of living organisms or on their progeny. Effluents from sewage treatment plants can be discharged into rivers in the surrounding treated areas with EDC. Globally, a very low proportion of EDC participates to the total dissolved organic carbon (DOC<1%) of a contaminated water, but their presence in water has to be taken into account owing to their potential toxicity for humans (brain cancer, affection of immune and reproductive systems, e.g.) and aquatic species (feminization, toxicity to fish and invertebrates, e.g. Most of these organic compounds are stable and difficult to oxidize by the traditional biological methods and require further treatment. Modern legislation in every country imposes environmental regulation and heath quality standard that steadily become more restrictive. Different strategies need to be adopted by the wastewater treatment plants to comply with the variety of refractory organic pollutants. These compounds include alkylphenols such as bisphenol-A (BPA) used in chemical industries to make polymers such as epoxy resin, polycarbonate plastics and dental sealants, as a precursor of flame-retardants or as coreactant in thermal papers, and in its original form is discharged from chemical reaction processes and after thermal depolymerization. BPA were detected in the effluent at levels from 0.16 to 0.36 µg/L. According to prior studies, in municipal wastewater and sewage sludge, BPA concentrations were found within the range of 0.033-36.7 mg/g in Canada, within 30-330 mg/g in Germany, and at 28.3 mg/g in China, indicating that BPA is not completely eliminated during wastewater treatment, and the maximum concentration of BPA detected was 17.2 mg/L in waste landfill leachates. Thus, wastewater treatment plants (WWTPs) are significant point sources of surface water pollution. Even though endocrine low dose effects of BPA are still under discussion it was recently demonstrated that low concentrations of BPA (even below 1.0 µg/L) in aquatic ecosystems had adverse effects (Oehlmann et al. Ecotoxicol. 9 (2000) 383-397).

Membrane treatments can be used as alternative methods to efficiently remove refractory pollutants from wastewaters. Removal of inorganic pollutants such as nitrogen ($NH_4$—N) was reported in literature using membrane bioreactors (MBR) where 93% removal of $NH_4$—N from synthetic wastewater was recorded, using MBR operating at solid retention time (SRT) of 7 d, HRT of 5 h, and TSS of 10 g/L, and 95% removal of $NH_4$—N from municipal synthetic wastewater was observed using MBR equipped with hollow fibre ultrafiltration membrane. A weak rate of biological removal of phosphorus in MBR, ranging from 45 to 70% was observed. However, the submerged membrane activated sludge process enables treated raw water with a high biomass concentration and long residence time. This coupling of membrane with activated sludge offers the possibility for high pollutant removal and low sludge production.

Other previous studies have reported that adsorption onto sludge, biodegradation and transformation are major pathways for BPA removal in activated sludge process. These mechanisms occurred in MBR however they may be different because of the different characteristics and properties of the MBR sludge. High SRT and biomass concentrations in MBR involve reevaluating adsorption and biodegradation mechanisms in order to integrate: i) easy access of pollutant to active adsorption sites of sludge due to the decrease of transfer limitation, induced by the less flocculated microorganisms, ii) intensified hydrolyze of macromolecules (retained by the membrane) which increases their retention time to become equal to that of particular mater, and iii) specific biomass composition.

Therefore, there is a need for processes for reducing bisphenol compound content of a wastewater using a membrane bioreactor.

Furthermore, there is a need for monitoring and regulating processes for reducing bisphenol compound content of a wastewater in a membrane bioreactor.

SUMMARY

It is an object of the present invention to provide submerged membrane bioreactor system and biological methods to remove bisphenol compound from municipal wastewaters.

According to an embodiment, there is provided a process of reducing a bisphenol compound content of a wastewater using a membrane bioreactor containing a biomass in a volatile suspended solid (VSS) form, which comprises operating continuously the membrane bioreactor to reduce bisphenol compound content when the bisphenol compound volumetric load is below 108 g m$^{-3}$ d$^{-1}$.

The volumetric load may be below 87 g m$^{-3}$ d$^{-1}$.

The volumetric load may be up to about 86.4 g m$^{-3}$ d$^{-1}$.

The biomass may have a volatile suspended solid (VSS) concentration from about 1.5 g/L to about 19 g/L, or from about 10 g/L to about 15 g/L.

In the process according to the present invention, a chemical oxygen demand (COD) of about 500 to about 1500 mg/L may be maintained in the membrane bioreactor.

The chemical oxygen demand (COD) may be about 1000 mg/L.

The hydraulic retention time of the membrane bioreactor may be from about 3 hours to about 6 hours.

The hydraulic retention time of the membrane bioreactor may be about 6 hours.

The hydraulic retention time of the membrane bioreactor may be about 3 hours.

The organic loading of the membrane bioreactor may be from about 0.3 to about 2.1 kg COD/kg VSS/d.

In the process according to the present invention, the bisphenol compound content in the wastewater may be up to about 10 mg/L.

The bisphenol compound content in the wastewater may be from about 1 to about 25 mg/L.

The bisphenol compound content in the wastewater may be from about 1 to about 20 mg/L.

The bisphenol compound content in the wastewater may be from about 1 to about 15 mg/L.

The bisphenol compound content in the wastewater may be from about 1 to about 10 mg/L.

The bisphenol compound content in the wastewater may be from about 1 to about 5 mg/L.

The chemical oxygen demand (COD) may be maintained with a source of carbon chosen from sodium acetate, peptone, glucose, saccharose, a starch, casein, sodium dodecyl sulfate, or combinations thereof.

The process according to the present invention may further comprise acclimatization of the biomass for oxidizing the bisphenol compound prior to operation of the membrane bioreactor for reducing the bisphenol compound content in the wastewater.

The acclimatization may be by performing a gradual addition of the bisphenol compound over a time sufficient to obtain a biomass capable of oxidizing the bisphenol compound.

The gradual addition of the bisphenol compound may be from about 1 mg/L to about 15 mg/L.

The gradual addition of the bisphenol compound may be from about 1 mg/L to about 25 mg/L.

The bisphenol compound may be chosen from 2,2-Bis(4-hydroxyphenyl)propane (Bisphenol A), 1,1-Bis(4-hydroxyphenyl)-1-phenyl-ethane (Bisphenol AP), 2,2-Bis(4-hydroxyphenyl)hexafluoropropane (Bisphenol AF), 2,2-Bis(4-hydroxyphenyl)butane (Bisphenol B), Bis-(4-hydroxyphenyl)diphenylmethane (Bisphenol BP), 2,2-Bis(3-methyl-4-hydroxyphenyl)propane, Bis(4-hydroxyphenyl)-2,2-dichlorethylene, 1,1-Bis(4-hydroxyphenyl)ethane (Bisphenol E), Bis(4-hydroxydiphenyl)methane (Bisphenol F), 2,2-Bis(4-hydroxy-3-isopropyl-phenyl)propane (Bisphenol G), 1,3-Bis(2-(4-hydroxyphenyl)-2-propyl)benzene (Bisphenol M), Bis(4-hydroxyphenyl)sulfone (Bisphenol S), 1,4-Bis(2-(4-hydroxyphenyl)-2-propyl)benzene (Bisphenol P), 5,5'-(1-Methylethyliden)-bis[1,1'-(bisphenyl)-2-ol]propane (Bisphenol PH), 1,1-Bis(4-hydroyphenyl)-3,3,5-trimethyl-cyclohexane (Bisphenol TMC), 1,1-Bis(4-hydroxyphenyl)-cyclohexane (Bisphenol Z).

The bisphenol compound may be 2,2-Bis(4-hydroxyphenyl)propane (Bisphenol A).

According to another embodiment, there is provided a process of reducing a bisphenol compound content of a wastewater using a membrane bioreactor containing a biomass in a volatile suspended solid (VSS) form, comprising:

monitoring and regulating a bisphenol compound volumetric load below 108 g m$^{-3}$ d$^{-1}$ to continuously reduce bisphenol compound content in the bioreactor.

In the process according to the present invention, the monitoring and regulating may be performed by measuring a concentration of the bisphenol compound of the wastewater and measuring the flow rate of the membrane bioreactor.

The volumetric load may be below 87 g m$^{-3}$ d$^{-1}$.

The volumetric load may be up to about 86.4 g m$^{-3}$ d$^{-1}$.

The biomass may have a volatile suspended solid (VSS) concentration from about 1.5 g/L to about 19 g/L, or from about 10 g/L to about 15 g/L.

In the process according to the present invention, a chemical oxygen demand (COD) of about 500 to about 1500 mg/L may be maintained in the membrane bioreactor.

The chemical oxygen demand (COD) may be about 1000 mg/L.

The hydraulic retention time of the membrane bioreactor may be from about 3 hours to about 6 hours.

The hydraulic retention time of the membrane bioreactor may be about 6 hours.

The hydraulic retention time of the membrane bioreactor may be about 3 hours.

The organic loading of the membrane bioreactor may be from about 0.3 to about 2.1 kg COD/kg VSS/d.

In the process according to the present invention, the bisphenol compound content in the wastewater may be up to about 10 mg/L.

The bisphenol compound content in the wastewater may be from about 1 to about 25 mg/L.

The bisphenol compound content in the wastewater may be from about 1 to about 20 mg/L.

The bisphenol compound content in the wastewater may be from about 1 to about 15 mg/L.

The bisphenol compound content in the wastewater may be from about 1 to about 10 mg/L.

The bisphenol compound content in the wastewater may be from about 1 to about 5 mg/L.

The chemical oxygen demand (COD) may be maintained with a source of carbon chosen from sodium acetate, peptone, glucose, saccharose, a starch, casein, sodium dodecyl sulfate, or combinations thereof.

The process according to the present invention may further comprise acclimatization of the biomass for oxidizing the bisphenol compound prior to operation of the membrane bioreactor for reducing the bisphenol compound content in the wastewater.

The acclimatization may be by performing a gradual addition of the bisphenol compound over a time sufficient to obtain a biomass capable of oxidizing the bisphenol compound.

The gradual addition of the bisphenol compound may be from about 1 mg/L to about 15 mg/L.

The gradual addition of the bisphenol compound may be from about 1 mg/L to about 25 mg/L.

The bisphenol compound may be chosen from 2,2-Bis(4-hydroxyphenyl)propane (Bisphenol A), 1,1-Bis(4-hydroxyphenyl)-1-phenyl-ethane (Bisphenol AP), 2,2-Bis(4-hydroxyphenyl)hexafluoropropane (Bisphenol AF), 2,2-Bis(4-hydroxyphenyl)butane (Bisphenol B), Bis-(4-hydroxyphenyl)diphenylmethane (Bisphenol BP), 2,2-Bis(3-methyl-4-hydroxyphenyl)propane, Bis(4-hydroxyphenyl)-2,2-dichlorethylene, 1,1-Bis(4-hydroxyphenyl)ethane (Bisphenol E), Bis(4-hydroxydiphenyl)methane (Bisphenol F), 2,2-Bis(4-hydroxy-3-isopropyl-phenyl)propane (Bisphenol G), 1,3-Bis(2-(4-hydroxyphenyl)-2-propyl)benzene (Bisphenol M), Bis(4-hydroxyphenyl)sulfone (Bisphenol S), 1,4-Bis(2-(4-hydroxyphenyl)-2-propyl)benzene (Bisphenol P), 5,5'-(1-Methylethyliden)-bis[1,1'-(bisphenyl)-2-ol]propane (Bisphenol PH), 1,1-Bis(4-hydroyphenyl)-3,3,5-trimethyl-cyclohexane (Bisphenol TMC), 1,1-Bis(4-hydroxyphenyl)-cyclohexane (Bisphenol Z).

The bisphenol compound may be 2,2-Bis(4-hydroxyphenyl)propane (Bisphenol A).

According to another embodiment, there is provided a membrane bioreactor containing a biomass in a volatile suspended solid (VSS) form, comprising:

a biomass capable of receiving a volumetric load of up to 108 g m$^{-3}$ d$^{-1}$ of bisphenol compound content in a wastewater, for reducing the bisphenol compound content from said wastewater.

The volumetric load may be below 87 g m$^{-3}$ d$^{-1}$.

The volumetric load may be up to about 86.4 g m$^{-3}$ d$^{-1}$.

The biomass may have a volatile suspended solid (VSS) concentration from about 1.5 g/L to about 19 g/L, or from about 10 g/L to about 15 g/L.

In the process according to the present invention, a chemical oxygen demand (COD) of about 500 to about 1500 mg/L may be maintained in the membrane bioreactor.

The chemical oxygen demand (COD) may be about 1000 mg/L.

The hydraulic retention time of the membrane bioreactor may be from about 3 hours to about 6 hours.

The hydraulic retention time of the membrane bioreactor may be about 6 hours.

The hydraulic retention time of the membrane bioreactor may be about 3 hours.

The organic loading of the membrane bioreactor may be from about 0.3 to about 2.1 kg COD/kg VSS/d.

In the process according to the present invention, the bisphenol compound content in the wastewater may be up to about 10 mg/L.

The bisphenol compound content in the wastewater may be from about 1 to about 25 mg/L.

The bisphenol compound content in the wastewater may be from about 1 to about 20 mg/L.

The bisphenol compound content in the wastewater may be from about 1 to about 15 mg/L.

The bisphenol compound content in the wastewater may be from about 1 to about 10 mg/L.

The bisphenol compound content in the wastewater may be from about 1 to about 5 mg/L.

The chemical oxygen demand (COD) may be maintained with a source of carbon chosen from sodium acetate, peptone, glucose, saccharose, a starch, casein, sodium dodecyl sulfate, or combinations thereof.

The process according to the present invention may further comprise acclimatization of the biomass for oxidizing the bisphenol compound prior to operation of the membrane bioreactor for reducing the bisphenol compound content in the wastewater.

The acclimatization may be by performing a gradual addition of the bisphenol compound over a time sufficient to obtain a biomass capable of oxidizing the bisphenol compound.

The gradual addition of the bisphenol compound may be from about 1 mg/L to about 15 mg/L.

The gradual addition of the bisphenol compound may be from about 1 mg/L to about 25 mg/L.

The bisphenol compound may be chosen from 2,2-Bis(4-hydroxyphenyl)propane (Bisphenol A), 1,1-Bis(4-hydroxyphenyl)-1-phenyl-ethane (Bisphenol AP), 2,2-Bis(4-hydroxyphenyl)hexafluoropropane (Bisphenol AF), 2,2-Bis(4-hydroxyphenyl)butane (Bisphenol B), Bis-(4-hydroxyphenyl)diphenylmethane (Bisphenol BP), 2,2-Bis(3-methyl-4-hydroxyphenyl)propane, Bis(4-hydroxyphenyl)-2,2-dichlorethylene, 1,1-Bis(4-hydroxyphenyl)ethane (Bisphenol E), Bis(4-hydroxydiphenyl)methane (Bisphenol F), 2,2-Bis(4-hydroxy-3-isopropyl-phenyl)propane (Bisphenol G), 1,3-Bis(2-(4-hydroxyphenyl)-2-propyl)benzene (Bisphenol M), Bis(4-hydroxyphenyl)sulfone (Bisphenol S), 1,4-Bis(2-(4-hydroxyphenyl)-2-propyl)benzene (Bisphenol P), 5,5'-(1-Methylethyliden)-bis[1,1'-(bisphenyl)-2-ol]propane (Bisphenol PH), 1,1-Bis(4-hydroyphenyl)-3,3,5-trimethyl-cyclohexane (Bisphenol TMC), 1,1-Bis(4-hydroxyphenyl)-cyclohexane (Bisphenol Z).

The bisphenol compound may be 2,2-Bis(4-hydroxyphenyl)propane (Bisphenol A).

According to another embodiment, there is provided, in a process of reducing a bisphenol compound content of a wastewater using a membrane bioreactor containing a biomass in a volatile suspended solid (VSS) form, the improvement comprising:

the biomass in the membrane bioreactor operating continuously to reduce bisphenol compound content when the bisphenol compound volumetric load is below 108 g m$^{-3}$ d$^{-1}$.

According to another embodiment, there is provided, in a process of reducing a bisphenol compound content of a wastewater using a membrane bioreactor containing a biomass in a volatile suspended solid (VSS) form, the improvement comprising:

monitoring and regulating a bisphenol compound volumetric load below 108 g m$^{-3}$ d$^{-1}$ to continuously reduce bisphenol compound content in the bioreactor.

BRIEF DESCRIPTION OF THE DRAWINGS

Further features and advantages of the present disclosure will become apparent from the following detailed description, taken in combination with the appended drawings, in which.

DETAILED DESCRIPTION OF THE PREFERRED EMBODIMENTS

In embodiments there is disclosed process of reducing a bisphenol compound content of a wastewater using a membrane bioreactor containing a biomass in a volatile suspended solid (VSS) form. The biomass in the membrane bioreactor is operating continuously to reduce bisphenol compound content when the bisphenol compound volumetric load is below 108 g m$^{-3}$ d$^{-1}$. According to an embodiment, the volumetric load is up to about 86.4 g m$^{-3}$ d$^{-1}$.

In embodiments there is also disclosed a membrane bioreactor containing a biomass in a volatile suspended solid (VSS) form, comprising a biomass capable of receiving a volumetric load of up to 108 g m$^{-3}$ d$^{-1}$ of bisphenol compound content in a wastewater, for reducing the bisphenol compound content from the wastewater The bisphenols are a group of chemical compounds with two hydroxyphenyl functionalities. Bisphenol A is the most popular representative of this group, often called only "bisphenol". Bisphenol compounds include 2,2-Bis(4-hydroxyphenyl)propane (Bisphenol A), 1,1-Bis(4-hydroxyphenyl)-1-phenyl-ethane (Bisphenol AP), 2,2-Bis(4-hydroxyphenyl)hexafluoropropane (Bisphenol AF), 2,2-Bis(4-hydroxyphenyl)butane (Bisphenol B), Bis-(4-hydroxyphenyl)diphenylmethane (Bisphenol BP), 2,2-Bis(3-methyl-4-hydroxyphenyl)propane, Bis(4-hydroxyphenyl)-2,2-dichlorethylene, 1,1-Bis(4-hydroxyphenyl)ethane (Bisphenol E), Bis(4-hydroxydiphenyl)methane (Bisphenol F), 2,2-Bis(4-hydroxy-3-isopropyl-phenyl)propane (Bisphenol G), 1,3-Bis(2-(4-hydroxyphenyl)-2-propyl)benzene (Bisphenol M), Bis(4-hydroxyphenyl)sulfone (Bisphenol S), 1,4-Bis(2-(4-hydroxyphenyl)-2-propyl)benzene (Bisphenol P), 5,5'-(1-Methylethyliden)-bis[1,1'-(bisphenyl)-2-ol]propane (Bisphenol PH), 1,1-Bis(4-hydroyphenyl)-3,3,5-trimethyl-cyclohexane (Bisphenol TMC), 1,1-Bis(4-hydroxyphenyl)-cyclohexane (Bisphenol Z).

Figure 1:
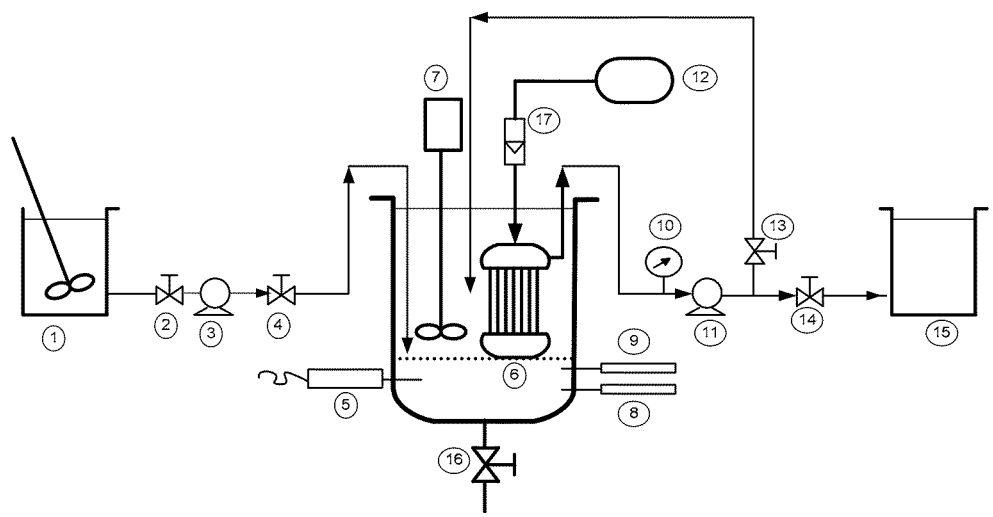
FIG. 1 illustrates a schematic diagram of the submerged membrane bioreactor system according to an embodiment of the present invention.

According to another embodiment, a submerged membrane bioreactor system (SMBR) operated at the laboratory scale is represented in the diagram of FIG. 1. The pilot unit is comprised of ZEEWEED® (ZW-1) hollow-fibre membranes of 0.04 μm rated pore diameter and 0.047 m$^2$ total filtering surface area, assembled vertically. The membrane unit is provided by Zenon Environmental & Co (Oakville, ON, Canada). ZW-1 membrane, whose module contains 80 fibres of 20 cm length, may be either operated in closed loop or in continuous mode of operation, through a stirred 6 L tank of 19.1 cm water high. Filtration may be achieved by drawing water through the membrane under a slight vacuum generated by a peristaltic pump (11) and measured by a manometer (10) located just after the membrane on the aspiration line. Air may be supplied through an extended aeration tube located inside the membrane module and also used to attach it vertically. The filtration of the effluent may be carried out intermittently (5 min of filtration followed by 30 s of pause) but air should be continuously injected in the SMBR system. An oxygen probe (5) may be connected to an oxymeter and installed in the bioreactor tank to measure dissolved oxygen concentration. The air flow-rate may be measured using a flow-meter (17). pH and temperature can also be measured during the experiments by using pH (8) and temperature (9) probes installed in the bioreactor tank.

Figure 2A:
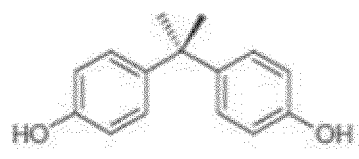
FIGS. 2A and 2B illustrate planar and 3D representation of bisphenol-A structure.
Figure 2B:
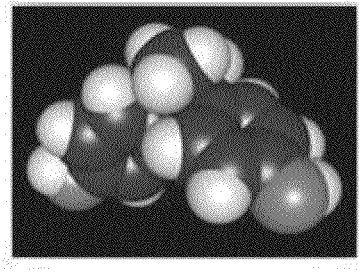

According to another embodiment, the chemicals used, all the organic solvents including methanol (MeOH) and dichloromethane (DCM), are all of analytical grade. Silica-based bonded C18 (Sep-Pak, 6 mL, 500 mg) cartridges are supplied by Waters Ltd (Mississauga, ON, Canada). BPA, glucose, (NH$_4$)$_2$SO$_4$, KH$_2$PO$_4$, and the deuterated [$_2$H$_{16}$] bisphenol A (BPA-d$_{16}$), used as internal standard, are purchased from Sigma-Aldrich Canada Ltd (Oakville, ON, Canada). Chemical structure of bisphenol A is shown in FIGS. 2A and 2B, as planar and 3D representations, respectively. All chemicals are of the highest purity commercially available. Stock solutions of BPA are prepared in MeOH at 2,000 mg/L and kept at 4° C. The stock solutions are used to regularly prepare working standard solutions for calibration and spiking experiments. Milli-Q water is prepared in the laboratory using a Milli-Q/Milli-RO system from Millipore Corp. (Billerica, Mass., USA).

According to some embodiments of the present invention, the SMBR system may be seeded by activated sludge collected from any suitable municipal wastewater treatment plant. The first step consists in developing the biomass by using a synthetic wastewater of a known composition carried out according known techniques. For example, the initial biomass may be developed using glucose as an organic substrate (400-2000 mg/L of COD), although any other suitable sources of carbon may be employed as organic substrates, for example sodium acetate or peptone. The biomass is developed over a period of time suitable to obtain a sufficiently concentrated biomass. According to an embodiment of the present invention, the biomass was developed for a period of 74 days and the volatile suspended solids (VSS) concentration ranged from initial 1.5 g/L to 14 g/L by membrane filtration under aeration and feeding of the membrane bioreactor with synthetic waste water daily prepared (1st stage).

The volatile suspended solids (VSS) concentration may range from about 1.5 g/L to 19 g/L, or from about 1.5 g/L to about 18 g/L, or from about 1.5 g/L to about 17 g/L, or from about 1.5 g/L to about 16 g/L, or from about 1.5 g/L to about 15 g/L, or from about 1.5 g/L to about 14 g/L, or from about 1.5 g/L to about 13 g/L, or from about 1.5 g/L to about 12 g/L, or from about 1.5 g/L to about 11 g/L, or from about 1.5 g/L to about 10 g/L, or from about 1.5 g/L to about 9 g/L, or from about 1.5 g/L to about 8 g/L, or from about 1.5 g/L to about 7 g/L, or from about 1.5 g/L to about 6 g/L, or from about 1.5 g/L to about 5 g/L, or from about 1.5 g/L to about 4 g/L, or from about 1.5 g/L to about 3 g/L, or from about 1.5 g/L to about 2 g/L, or from about 2 g/L to 19 g/L, or from about 2 g/L to about 18 g/L, or from about 2 g/L to about 17 g/L, or from about 2 g/L to about 16 g/L, or from about 2 g/L to about 15 g/L, or from about 2 g/L to about 14 g/L, or from about 2 g/L to about 13 g/L, or from about 2 g/L to about 12 g/L, or from about 2 g/L to about 11 g/L, or from about 2 g/L to about 10 g/L, or from about 2 g/L to about 9 g/L, or from about 2 g/L to about 8 g/L, or from about 2 g/L to about 7 g/L, or from about 2 g/L to about 6 g/L, or from about 2 g/L to about 5 g/L, or from about 2 g/L to about 4 g/L, or from about 2 g/L to about 3 g/L, or from about 3 g/L to 19 g/L, or from about 3 g/L to 18 g/L, or from about 3 g/L to 17 g/L, or from about 3 g/L to 16 g/L, or from about 3 g/L to about 15 g/L, or from about 3 g/L to about 14 g/L, or from about 3 g/L to about 13 g/L, or from about 3 g/L to about 12 g/L, or from about 3 g/L to about 11 g/L, or from about 3 g/L to about 10 g/L, or from about 3 g/L to about 9 g/L, or from about 3 g/L to about 8 g/L, or from about 3 g/L to about 7 g/L, or from about 3 g/L to about 6 g/L, or from about 3 g/L to about 5 g/L, or from about 3 g/L to about 4 g/L, or from about 4 g/L to 19 g/L, or from about 4 g/L to 18 g/L, or from about 4 g/L to 17 g/L, or from about 4 g/L to about 16 g/L, or from about 4 g/L to about 15 g/L, or from about 4 g/L to about 14 g/L, or from about 4 g/L to about 13 g/L, or from about 4 g/L to about 12 g/L, or from about 4 g/L to about 11 g/L, or from about 4 g/L to about 10 g/L, or from about 4 g/L to about 9 g/L, or from about 4 g/L to about 8 g/L, or from about 4 g/L to about 7 g/L, or from about 4 g/L to about 6 g/L, or from about 4 g/L to about 5 g/L, or from about 5 g/L to 19 g/L, or from about 5 g/L to 18 g/L, or from about 5 g/L to 17 g/L, or from about 5 g/L to about 16 g/L, or from about 5 g/L to about 15 g/L, or from about 5 g/L to about 14 g/L, or from about 5 g/L to about 13 g/L, or from about 5 g/L to about 12 g/L, or from about 5 g/L to about 11 g/L, or from about 5 g/L to about 10 g/L, or from about 5 g/L to about 9 g/L, or from about 5 g/L to about 8 g/L, or from about 5 g/L to about 7 g/L, or from about 5 g/L to about 6 g/L, or from about 6 g/L to 19 g/L, or from about 6 g/L to 18 g/L, or from about 6 g/L to 17 g/L, or from about 6 g/L to about 16 g/L, or from about 6 g/L to about 15 g/L, or from about 6 g/L to about 14 g/L, or from about 6 g/L to about 13 g/L, or from about 6 g/L to about 12 g/L, or from about 6 g/L to about 11 g/L, or from about 6 g/L to about 10 g/L, or from about 6 g/L to about 9 g/L, or from about 6 g/L to about 8 g/L, or from about 6 g/L to about 7 g/L, or from about 7 g/L to 19 g/L, or from about 7 g/L to 18 g/L, or from about 7 g/L to 17 g/L, or from about 7 g/L to about 16 g/L, or from about 7 g/L to about 15 g/L, or from about 7 g/L to about 14 g/L, or from about 7 g/L to about 13 g/L, or from about 7 g/L to about 12 g/L, or from about 7 g/L to about 11 g/L, or from about 7 g/L to about 10 g/L, or from about 7 g/L to about 9 g/L, or from about 7 g/L to about 8 g/L, or from about 8 g/L to 19 g/L, or from about 8 g/L to 18 g/L, or from about 8 g/L to 17 g/L, or from about 8 g/L to 16 g/L, or from about 8 g/L to about 15 g/L, or from about 8 g/L to about 14 g/L, or from about 8 g/L to about 13 g/L, or from about 8 g/L to about 12 g/L, or from about 8 g/L to about 11 g/L, or from about 8 g/L to about 10 g/L, or from about 8 g/L to about 9 g/L, or from about 9 g/L to 19 g/L, or from about 9 g/L to 18 g/L, or from about 9 g/L to 17 g/L, or from about 9 g/L to about 16 g/L, or from about 9 g/L to about 15 g/L, or from about 9 g/L to about 14 g/L, or from about 9 g/L to about 13 g/L, or from about 9 g/L to about 12 g/L, or from about 9 g/L to about 11 g/L, or from about 9 g/L to about 10 g/L, or from about 10 g/L to 19 g/L, or from about 10 g/L to 18 g/L, or from about 10 g/L to 17 g/L, or from about 10 g/L to about 16 g/L, or from about 10 g/L to about 15 g/L, or from about 10 g/L to about 14 g/L, or from about 10 g/L to about 13 g/L, or from about 10 g/L to about 12 g/L, or from about 10 g/L to about 11 g/L, or from about 11 g/L to 19 g/L, or from about 11 g/L to 18 g/L, or from about 11 g/L to 17 g/L, or from about 11 g/L to about 16 g/L, or from about 11 g/L to about 15 g/L, or from about 11 g/L to about 14 g/L, or from about 11 g/L to about 13 g/L, or from about 11 g/L to about 12 g/L, or from about 12 g/L to 19 g/L, or from about 12 g/L to 18 g/L, or from about 12 g/L to 17 g/L, or from about 12 g/L to 16 g/L, or from about 12 g/L to about 15 g/L, or from about 12 g/L to about 14 g/L, or from about 12 g/L to about 13 g/L, or from about 13 g/L to 19 g/L, or from about 13 g/L to 19 g/L, or from about 13 g/L to 17 g/L, or from about 13 g/L to 16 g/L, or from about 13 g/L to about 15 g/L, or from about 13 g/L to about 14 g/L, or from about 14 g/L to 19 g/L, or from about 14 g/L to 18 g/L, or from about 14 g/L to 17 g/L, or from about 14 g/L to about 16 g/L, or from about 14 g/L to about 15 g/L, or from about 15 g/L to 19 g/L, or from about 15 g/L to 18 g/L, or from about 15 g/L to 17 g/L, or from about 15 g/L to about 16 g/L, or from about 16 g/L to 19 g/L, or from about 16 g/L to 18 g/L, or from about 16 g/L to about 17 g/L, or from about 17 g/L to 19 g/L, or from about 17 g/L to about 18 g/L, or from about 18 g/L to about 19 g/L.

During the first stage the SMBR may be successively operated in closed loop and in continuous mode of operation. According to an embodiment, the hydraulic retention time (HRT may be 6 h. However, the HRT may range from about 3 h, or 4 h, or 5 h, or from about 3 h to about 6 h, or from about 4 h to about 6 h, or from about 5 h to about 6 h, or from about 3 h to about 5 h, or from about 3 h to about 4 h. The organic loading may preferably ranged between about 0.3 and about 2.1 kg COD/kg VSS/d. However, the organic loading also vary from about 0.3 to about 2.1, or from about 0.3 to about 2.0, or from about 0.3 to about 1.5, or from about 0.3 to about 1.0, or from about 0.3 to about 0.5, or from about 0.5 to about 2.1, or from about 0.5 to about 2.0, or from about 0.5 to about 1.5, or from about 0.5 to about 1.0, or from about 1.0 to about 2.1, or from about 1.0 to about 2.0, or from about 1.0 to about 1.5, or from about 1.5 to about 2.1, or from about 1.5 to about 2.0, or from about 2.0 to about 2.1 kg COD/kg VSS/d.

Once the biomass is developed, the bisphenol compound (e.g. Bisphenol-A (BPA) may be gradually added to acclimatize it to oxidizing the bisphenol compound. while the total COD is maintained at around 1000 mg/L by the addition of glucose (2nd stage). The total COD may be maintained from about 500 mg/L to about 1500 mg/L, or from about 600 mg/L to about 1500 mg/L, or from about 700 mg/L to about 1500 mg/L, or from about 800 mg/L to about 1500 mg/L, or from about 900 mg/L to about 1500 mg/L, or from about 1000 mg/L to about 1500 mg/L, or from about 1100 mg/L to about 1500 mg/L, or from about 1200 mg/L to about 1500 mg/L, or from about 1300 mg/L to about 1500 mg/L, or from about 1400 mg/L to about 1500 mg/L, 500 mg/L to about 1400 mg/L, or from about 600 mg/L to about 1400 mg/L, or from about 700 mg/L to about 1400 mg/L, or from about 800 mg/L to about 1400 mg/L, or from about 900 mg/L to about 1400 mg/L, or from about 1000 mg/L to about 1400 mg/L, or from about 1100 mg/L to about 1400 mg/L, or from about 1200 mg/L to about 1400 mg/L, or from about 1300 mg/L to about 1400 mg/L, 500 mg/L to about 1300 mg/L, or from about 600 mg/L to about 1300 mg/L, or from about 700 mg/L to about 1300 mg/L, or from about 800 mg/L to about 1300 mg/L, or from about 900 mg/L to about 1300 mg/L, or from about 1000 mg/L to about 1300 mg/L, or from about 1100 mg/L to about 1300 mg/L, or from about 1200 mg/L to about 1300 mg/L, 500 mg/L to about 1200 mg/L, or from about 600 mg/L to about 1200 mg/L, or from about 700 mg/L to about 1200 mg/L, or from about 800 mg/L to about 1200 mg/L, or from about 900 mg/L to about 1200 mg/L, or from about 1000 mg/L to about 1200 mg/L, or from about 1100 mg/L to about 1200 mg/L, 500 mg/L to about 1100 mg/L, or from about 600 mg/L to about 1100 mg/L, or from about 700 mg/L to about 1100 mg/L, or from about 800 mg/L to about 1100 mg/L, or from about 900 mg/L to about 1100 mg/L, or from about 1000 mg/L to about 1100 mg/L, 500 mg/L to about 1000 mg/L, or from about 600 mg/L to about 1000 mg/L, or from about 700 mg/L to about 1000 mg/L, or from about 800 mg/L to about 1000 mg/L, or from about 900 mg/L to about 1000 mg/L, 500 mg/L to about 900 mg/L, or from about 600 mg/L to about 900 mg/L, or from about 700 mg/L to about 900 mg/L, or from about 800 mg/L to about 900 mg/L, 500 mg/L to about 800 mg/L, or from about 600 mg/L to about 800 mg/L, or from about 700 mg/L to about 800 mg/L, 500 mg/L to about 700 mg/L, or from about 600 mg/L to about 700 mg/L, 500 mg/L to about 600 mg/L.

According to an embodiment, the biomass is to acclimatize it to oxidizing bisphenol A by gradually introducing 1 mg/L to about 25 mg/L Bisphenol A, while the total COD is maintained at around 1000 mg/L by the addition of glucose.

According to an embodiment, the biomass may be acclimatized in oxidizing the bisphenol compound over of period of time sufficient to obtain a biomass capable of oxidizing said bisphenol compound. According to another embodiment, a biomass was acclimatized to oxidizing BPA during a period of 100 days (i.e., from 74th day to 174th day of treatment period). The acclimatization phase is important for supporting the micro-organisms which possess the enzymatic material necessary to degrade a toxic compound and revealing a new population which is adapted to this toxic compound and which is able to consume it as a substrate. The results have been compared with a conventional activated sludge reactor (CASR) operated in the same conditions (HRT, volumetric and hydraulic loading). It is worth noting that, during both successive stages (biomass development and biomass acclimatization), the performance of the SMBR was evaluated by the measurements of COD. Samples are daily withdrawn at the inlet (raw effluent) and outlet (filtrate) of the experiment unit for analysis. According to yet another embodiment, the third successive stage (3rd stage) consists to maintain the concentration of bisphenol compound (e.g. BPA) at a certain level (e.g. for BPA at around 1 mg/L) in the synthetic wastewater effluent and evaluate the performance of the system by analyzing residual BPA concentrations at the inlet, outlet and in the mixed liquor.

To elucidate the plausible mechanisms of the biological removal of the bisphenol compounds, the removal of BPA was tested (adsorption on the biomass versus biological oxidation), and additional experiments are carried out in Erlenmeyer shake flasks containing either activated sludge or inactivated sludge in the presence of BPA. The sludge used for the tests is withdrawn from the SMBR unit. Prior to BPA addition in activated sludge sample, sludge is initially centrifuged at 8000 rpm at 4° C. for 10 min and softly washed. The inactivated sludge is prepared by subjecting sludge samples to a sterilization by adding 1.0 mL $HgSO_4$ (20 g/L) to 200 mL of sludge. Then, the sterilized and centrifuged sample sludge is placed in conical flasks and shaken at 150 rpm at 22±2° C. for 2 h, and then centrifuged at 8000 rpm at 4° C. for 10 min. Different concentrations of BPA (0.45 to 18.2 mg/L) are added in the same mass of sludge (3.0 g of sludge diluted to 200 mL with milli-Q water). The concentration of total suspended solid (sludge) in the flask was 15 g TSS $L^{-1}$, which is similar to that observed in the SMBR system of the present invention. Three types of experiments are successively carried out. The first set tests consists in evaluating the adsorption capacity of BPA on sludge. For that, two Erlenmeyer shake flasks containing 200 mL of activated sludge (15 g TSS $L^{-1}$) are respectively contaminated by 5 and 10 mg/L of BPA. The flasks are shaken at 150 rpm at 22±2° C., pH=7±0.5 for 24 h and samples are taken in regular time intervals, and the amount of BPA adsorbed is determined by measuring the residual BPA concentrations in solution The same assay is carried out using inactivated sludge. Subsequently, isotherm adsorption experiments are carried out using different concentrations of BPA (0.45-18.2 mg/L) spiked in a same mass of sludge (200 ml of inactivated sludge at 15 g TSS/L). The flasks are shaken at 150 rpm for 2 h and samples are taken for analysis.

According to the second set of assays, adsorption kinetic is evaluated using 200 mL of inactivated sludge at 15 g $L^{-1}$ and 2.0 mg/L of BPA is initially used. The flasks are shaken at 150 rpm at 22±2° C. and samples are taken at regular interval times (5, 10, 15, 20, 30, 40, 60, 80, 100, 120 min). Several appropriate models are reported in literature, but for the purposes of the experiments, three models are used, namely the Lagergren model (first order model) as described by Lagergren in Kung Sven. Veten. Hand 24 (1898) 1-39, the pseudo-second-order as described by Ho et al. in Process Biochemistry 34 (1999) 451-465, and the Elovich model as described in Chemical reviews (1960) 267-312.

The third set of assays consisted of evaluating the thermodynamic parameters such as Gibbs free energy)($\Delta G°$), enthalpy)($\Delta H°$ and entropy)($\Delta S°$ changes, which parameters allowed to determine whether BPA sorption on sludge was due to physisorption or chemisorption phenomenon or the combination of both phenomena. For that, Erlenmeyer flasks containing 200 mL of inactivated sludge at 15 g TSS $L^{-1}$ and 5 mg$L^{-1}$ of BPA are used. Mixing is achieved at 150 rpm and different temperatures (22±2, 30±2 and 40±2° C.) are respectively imposed for 2 h of experiment time.

The amount of adsorbed BPA at any time (t) (qt, mg.g$^{-1}$) and the sorption efficiency (RE, %) are calculated according to the following equations (Eq. (1) and Eq. (2):

$$q_t = \frac{(C_0 - C_t) * V}{M} \quad (1)$$

$$RE(\%) = \frac{(C_0 - C_t)}{C_0} \times 100 \quad (2)$$

where $C_0$ and $C_t$ (mg $L^{-1}$) are the initial and residual concentrations of BPA in the liquid phase, respectively;

V(L) represents the volume of sludge solution, and

M (g) the mass of the sludge.

By analogy, the amount of BPA adsorbed on sludge at equilibrium (qe, mg/g) and the sorption efficiency is determined according to equations (1) described above. The specific adsorption coefficient ($K_D$) can also be calculated. The coefficient $K_D$ is the ratio between the amount of BPA adsorbed on sludge at equilibrium ($q_e$) and the residual ($C_e$) concentrations, according to the following equation (Eq. (3)):

$$K_d = \frac{q_e}{C_e} \quad (3)$$

Bacteria activity is evaluated by respirometric measurements, which are carried out periodically in the SMBR to determine Oxygen Uptake Rate (OUR). The method used is the on-off dissolved oxygen (DO) control method with simultaneous Oxygen Uptake Rate estimation proposed by Suescun et al. in Water Environment Res. 70(3) (1998) 316-322. The dynamic behavior of the DO concentration as a function of time (t) in a completely mixed aerated reactor can be expressed by the mass balance (Eq. (4)):

$$\frac{dDO}{dt} = K_L a(DO_s - DO) - OUR + \frac{Q}{V}(DO_i - DO) \quad (4)$$

where,

DO (mg $O_2$/L)=concentration of DO in the reactor;

$DO_i$ (mg $O_2$/L)=concentration of DO in the influent;

$DO_s$ (mg $O_2$/L)=maximum concentration (saturation) of DO;

Q (L/h)=influent and effluent flow rate;

V (L)=volume of the reactor;

$K_L \alpha$ ($h^{-1}$)=volumetric mass-transfer coefficient for DO;

OUR (mg $O_2$/h)=oxygen uptake rate.

When the air is injected, the DO concentration increases until a $DO_{Max}$ limit is reached. In these conditions the third term of Eq. (4) can be neglected and the following equation (Eq. (5)) can be written:

$$\frac{dDO}{dt} = K_L a(DO_s - DO) - OUR \quad (5)$$

When the air injection is turned off, DO concentration decreases with a negative constant slope and the following equation (Eq. (6)) can be written:

$$\frac{dDO}{dt} = -OUR \qquad (6)$$

Specific oxygen uptake rate (SOUR) can be deducted as follows:

$$SOUR = \frac{OUR}{VSS} \qquad (7)$$

where,
VSS (g/L)=volatile suspended solids.

Regarding operating parameters of the analytical procedures, the pH and temperature are determined using a pH meter equipped with a double-junction electrode with Ag/AgCl reference cell for pH measurement, and a thermometer for temperature measurement. Dissolved oxygen (DO) is measured using a polarographic probe connected to a dissolved oxygen controller microprocessor.

During the experimental work, samples are taken for different analyses. The measurements of organic elements (COD, bisphenol-A, volatile suspended solids (VSS)), and inorganic elements (N—$NH_4$, P—$PO_4$) are carried out to evaluate the performance of the process. BPA is also analyzed using liquid chromatography mass spectrometer (LC-MS/MS) after extraction and purification on a solid phase. All parameters are determined in conformity with standard methods. COD is measured by colorimetric method in presence of potassium dichromate and the absorbance is measured at 600 nm using a UV spectrometer according to a standard method (MA. 315-DCO 1.0 (2003), CEAEQ, Quebec Ministry of Environment). The sludge mixed liquor is centrifuged at 8,000 rpm at 4° C. for 20 min, and the supernatant is filtrated with a 1.2 µm glass filter to analyze soluble COD (SCOD). SCOD is used to evaluate supernatant quality and performance of biological activity. Sludge suspended solids (TSS) measurement is conducted by centrifugation of 100 mL of sample from sludge liquor at 8,000 rpm for 20 min at 4° C., and the pellet is kept for drying at 105° C. for 24 h. Subsequently, VSS is measured at 550° C. for 30 min. TSS and VSS are determined in conformity with a standard method (MA. 104-S.S. 1.1 (2008) CEAEQ, Quebec Ministry of Environment). Ammonia nitrogen ($NH_3$—N) and phosphorus ($PO_4$—P) are analyzed simultaneously according to analytical methods (QuikChem® Method 10-107-06-2-B and QuikChem® Method 10-115-01-1-B) proposed by Lachat Instruments (Loveland, Colo., USA).

In embodiments there is also disclosed a process of reducing a bisphenol compound content of a wastewater using a membrane bioreactor containing a biomass in a volatile suspended solid (VSS) form, where monitoring and regulating a bisphenol compound volumetric load below 108 g m$^{-3}$ d$^{-1}$ is performed to continuously reduce bisphenol compound content in said bioreactor. According to an embodiment, monitoring and regulating of the volumetric load is performed by measuring a concentration of said bisphenol compound of said wastewater. The measurements may be made by any suitable method capable of detecting the bisphenol compound. For example, the detection methodology may be a liquid chromatography mass spectrometer based assay such as described herein, but it may also be any other assay specific for detecting the bisphenol compounds. The compound concentration may then be combined with a measurement of the flow rate of the membrane bioreactor, which may be measured with a flow meter and the known volume of the reactor according to the following relationship:

$$\text{volumetric load} = \text{compound concentration}\left(\frac{g}{L}\right) \times \frac{\text{flow rate of membrane bioreactor}\left(\frac{L}{d}\right)}{\text{volume of membrane bioreactor } (m3)}$$

Figure 3:
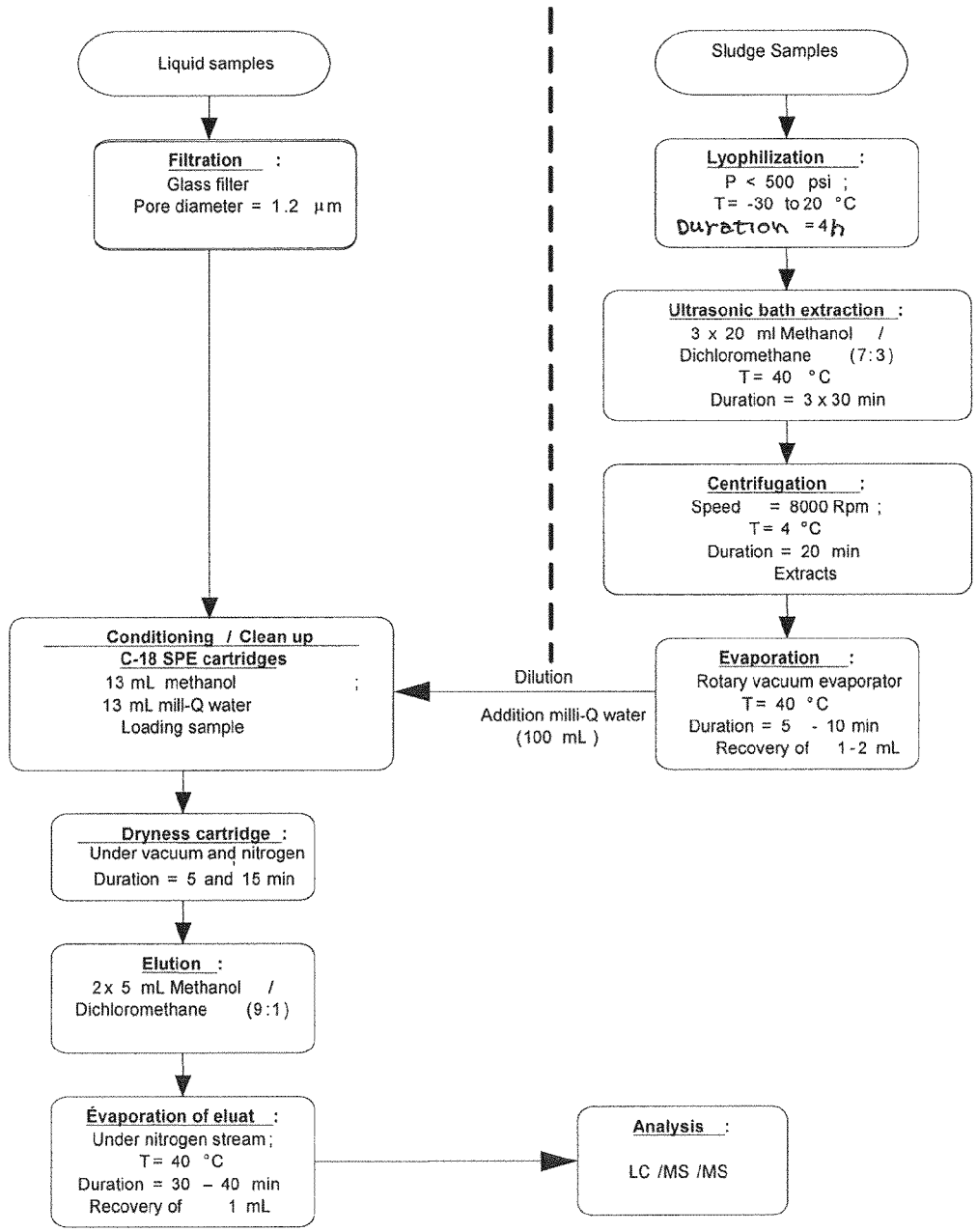
FIG. 3 illustrates a chart showing the overall scheme of the analytical procedure used for the determination of BPA and its degradation products according to an embodiment of the present invention.

The procedures of extraction and analysis of bisphenol-A that are carried out will now be described. BPA is analyzed in samples collected in influent, effluent and sludge liquor in pre-cleaned glass bottles wrapped in aluminum foil and frozen at 4° C. Frozen sludge samples are freeze-dried. After lyophilization, the sludge is homogenized and stored frozen, in glass amber bottles. The overall scheme of the analytical procedure used for the determination of BPA, and its degradation products, is shown in FIG. 3. This analytical procedure is a modified protocol based on prior research works reported by Petrovic et al, Anal. Chem. 72(19) (2000) 4560-4567. Target compounds are extracted from sludge with a solvent mixture of MeOH/DCM (7:3, v/v). A mass of 0.5 g of lyophilized and homogenized sludge sample is ultrasonicated for 30 min with 20 mL of solvent mixture in an ultrasonic bath at 40° C. The extract is separated by centrifugation, and the step is repeated three times. The extracts are pooled and concentrated (to an approximate volume of 2 mL) using a rotary vacuum evaporator at 30° C., and redissolved in 100 mL of milli-Q water. Solid phase extraction (SPE) method is used for cleanup and preconcentration of extracts. 6-mL cartridges packed with 500 mg of C-18 sorbent are used (Waters Ltd). Cartridges are conditioned by passing 13 mL of MeOH and 13 mL of milli-Q water by gravity. Extracts (100 mL) are loaded by gravity. After loading, cartridges are washed with 7 mL of milli-Q water, then allowed to dry for 5 min using a Visiprep SPE manifold connected to a vacuum system, and after kept under nitrogen stream for 15 min. Trapped compounds are desorbed using a MeOH/DCM ratio of 9:1 (v/v). Elution is performed in 10 mL. First by adding 5 mL volume of solvent mixture for 5 min of waiting period to increase the contact time mixture between the solvent and the adsorbed compounds and followed by addition of 5 mL of solvent mixture. The extracts are evaporated at 40° C. with a gentle stream of nitrogen, and then dried extracts reconstituted with MeOH to a final volume of 2 mL. Finally, 1 mL is injected into the liquid chromatography mass spectrometer (LC-MS/MS) for analysis.

Liquid samples (20 mL of each inlet and outlet) are directly cleaned up and pre-concentrated according to SPE method as described above and also analyzed in LC-MS/MS. Analyses in LC are done using a reversed-phase Hypersil™ Gold column (100×2.1 mm×3 µm) from Thermo Scientific (Nepean, ON, Canada). An isocratic flow of 0.2 mL/min of a water/MeOH eluent (5:95, v/v) is used at room temperature for elution. Detection is carried out in a MS-MS system using an electrospray (ESI) interface in negative ionization (NI) mode. The recoveries (percent of standard added to sample recovered during extraction and cleanup) and reproducibility (relative standard deviation for triplicate analysis) of the methods are determined by a spiking experiment. Liquid and sludge spiked with known BPA concentrations are analyzed applying the methods described above, together with blank samples (no spiked liquid and sludge sample).

Figure 4:
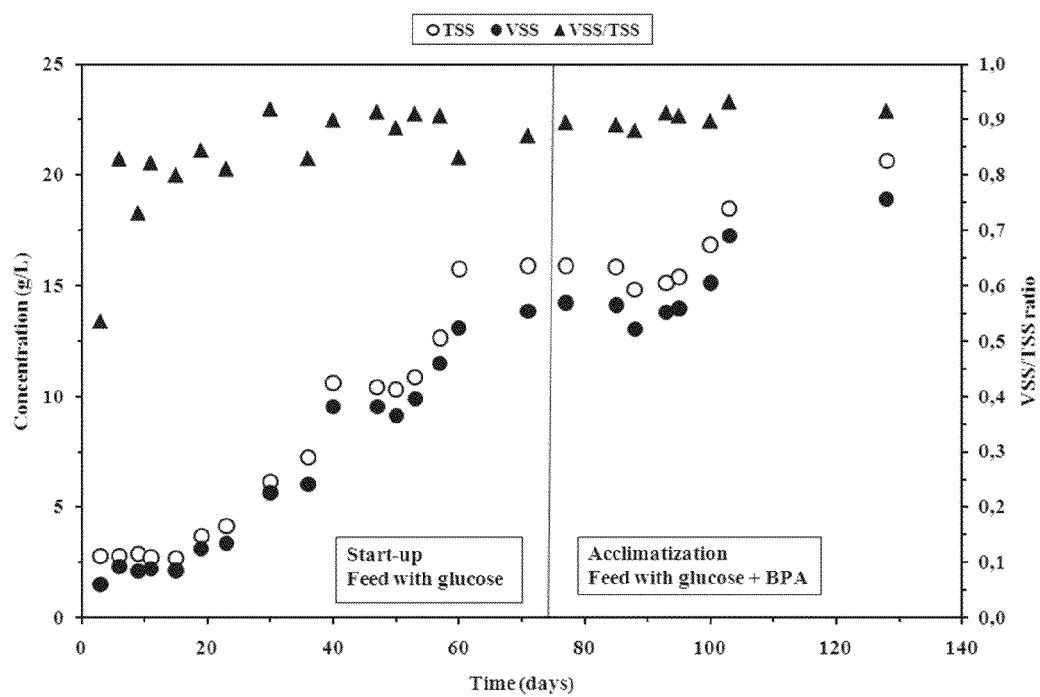
FIG. 4 illustrates a graph showing variation of biomass concentration during the start-up and acclimatization periods of a membrane bioreactor according to an embodiment of the present invention.

Regarding the development and acclimatization of the biomass, the initial experiment is conducted to develop biomass in SMBR system for a start-up period of 74 days as mentioned above. The system was fed with synthetic medium containing glucose as biodegradable organic substrate and the initial biomass concentration was 1.5 g VSS/L. The biomass concentration remained relatively constant for the first 15 days, after biomass increased gradually for the next 25 days as shown in FIG. 4. The biomass reached stationary phase from $40^{th}$ day to $53^{rd}$ day. From the $53^{rd}$ day, biomass concentration is increased and reaches a plateau (around 14 g VSS/L) from $64^{th}$ day to $75^{th}$ day.

From the $75^{th}$ day, biomass is acclimatized to the bisphenol compound (BPA). A concentration of 1.0 mg BPA/L is added in the synthetic municipal waste water (SMWW) and the COD is maintained around 1,000 mg/L for additional period of 100 days. Biomass concentration remained relatively constant (around 14 g VSS/L) for the first 18 days of acclimatization. After that, biomass is increased up to 19 g VSS/L. In both cases, start-up and acclimatization periods, the change in biomass concentrations (in terms of VSS and TSS evolution) is quite similar. Initially, a VSS/TSS ratio of 0.5 was recorded. Then, it increased and stabilized around 0.8-0.9 irrespective of the variation of biomass concentration and long SRT. These results indicate that a very low sludge mineralization occurred in the SMBR. Likewise, the constant value of the ratio VSS/TSS indicates that the amount of active biomass and inorganic matters maintained a dynamic balance. These results are similar to those recorded by Heran et al. Biochem. Eng. J. 38 (2008) 70-77, while treating a synthetic effluent by using a membrane bioreactor unit.

The specific growth rate of the biomass (μ) was determined in the SMBR system using the following equation (Eq. (8)):

$$\mu = \frac{1}{VSS} \frac{dVSS}{dt} \quad (8)$$

After integration and rearrangement, the Eq. (9) can be obtained:

$$\ln VSS = \ln VSS_0 + \mu t \quad (9)$$

Figure 5:
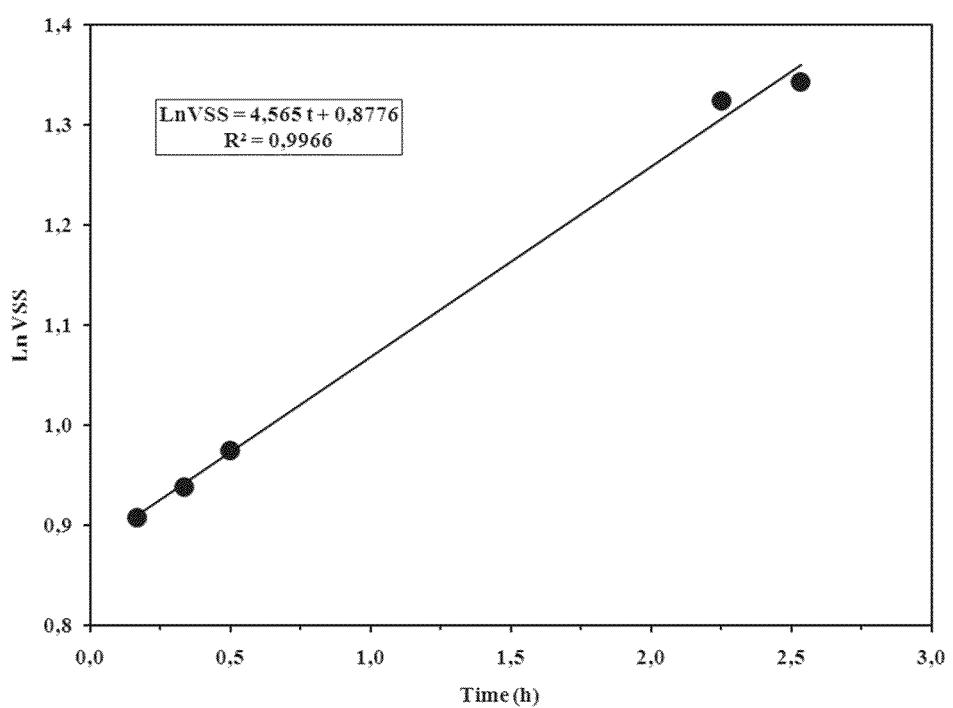
FIG. 5 illustrates a graph showing the specific biomass growth rate according to an embodiment of the present invention.

$VSS_0$ represents the initial biomass concentration. The specific biomass growth rate (μ) can be determined by plotting ln VSS against time (t) as shown in FIG. 5. At the start of the experiments (start-up period), the specific biomass growth rate (μ) was 4.6 $d^{-1}$. This value was lower than those (13.1 $d^{-1}$ and 7.5 $d^{-1}$) reported by Kurian et al., Chemosphere 65 (2006) 1204-1211, while acetate and propionate were respectively subjected to degradation. Those values are 1.6 and 2.8 times higher than that measured in the present study. This difference can be probably due to the fact that the Kurian's experiments were carried out at a temperature of 40° C., which can contribute to accelerate bacteria activity compared to a temperature of 22±2° C. imposed for the present invention.

In activated sludge process, oxygen consumption by biomass is often associated to the substrate removal and biomass growth. Thus, biomass respiratory activity measurements by the oxygen uptake rate (OUR) are carried out during both start-up (without BPA) and acclimatization periods (with BPA) in order to evaluate active biomass and also observed eventual alterations of bacterial activity in the SMBR system.

Figure 6:
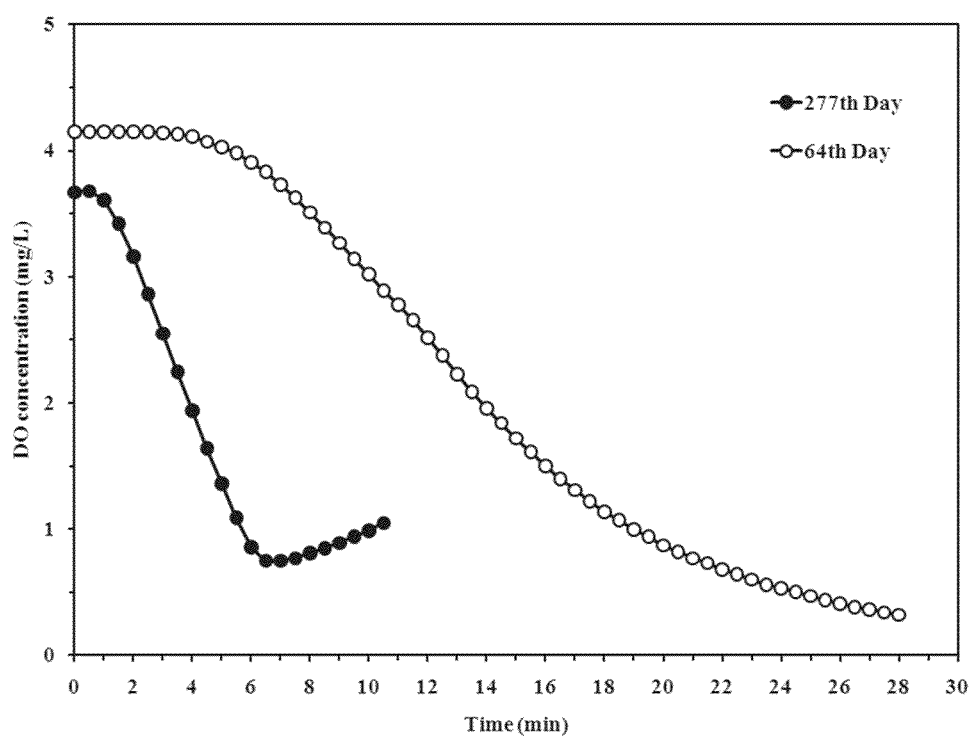
FIG. 6 illustrates a graph showing specific oxygen uptake rate measured in absence and in presence of BPA in a process according to an embodiment of the present invention.

Specific OUR (SOUR) in the absence of BPA is measured on the $64^{th}$ day and the value measured is 1.27 mg $O_2$/g VSS.h (11.3 g VSS/L of biomass concentration) as shown in FIG. 6. By comparison, 2.00 mg $O_2$/g VSS.h (17.5 g VSS/L of biomass concentration) of SOUR is measured on $277^{th}$ day in the presence of BPA. The SOUR values recorded (in the presence and absence of BPA) do not reveal any significant change in the microbial respiratory activity, even if the SRT increased. These values of SOUR are in the range of those recorded by Kurian et al. while treating easily biodegradable substrates (such as acetate and propionate). Although, the bacteria growth rate is relatively low, the microbial community in the bioreactor of the present invention had better activity at 22±2° C. compared to some mentioned in the prior art.

Figure 7:
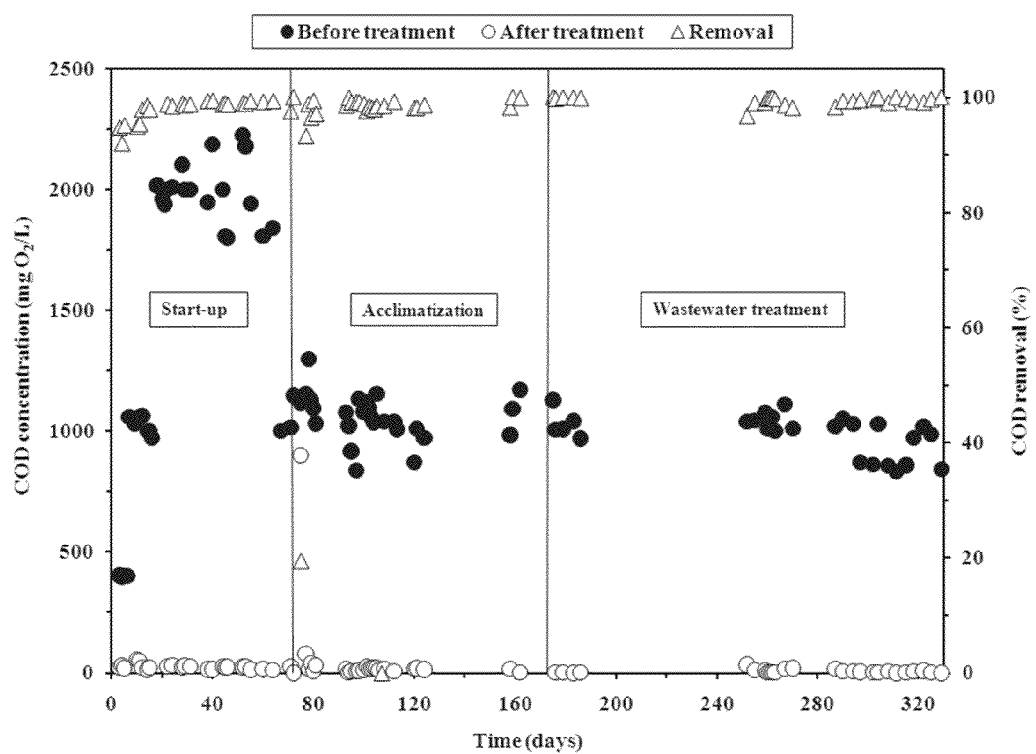
FIG. 7 illustrates a graph showing evolution of COD concentration in SMBR according to an embodiment of the present invention.

A COD concentration of 400 mg/L is initially maintained in SMWW during the first 6 days required for biomass development in SMBR by using glucose as substrate. Then, gradually the initial COD concentration is increased to 1,000 mg COD/L from the $7^{th}$ day to $17^{th}$ day and it is increased to 2,000 mg COD/L from the $18^{th}$ day to $64^{th}$ day. After that, the initial COD concentration is maintained constant around 1,000 mg COD/L throughout the use of the process of the present invention. During the start-up period, COD removal up to 99% can be reached. A suitable effluent quality is achieved with residual COD concentration lower than 30 mg/L as shown in FIG. 7. On $75^{th}$ day, the SMWW was spiked with BPA (1 mg/L) in order to acclimatize microbial community to BPA degradation in the SMBR system. The average COD removal rate (very high COD removal of 99%) remains similar to the good-quality effluent obtained during SMBR operation without BPA addition.

Figure 8:
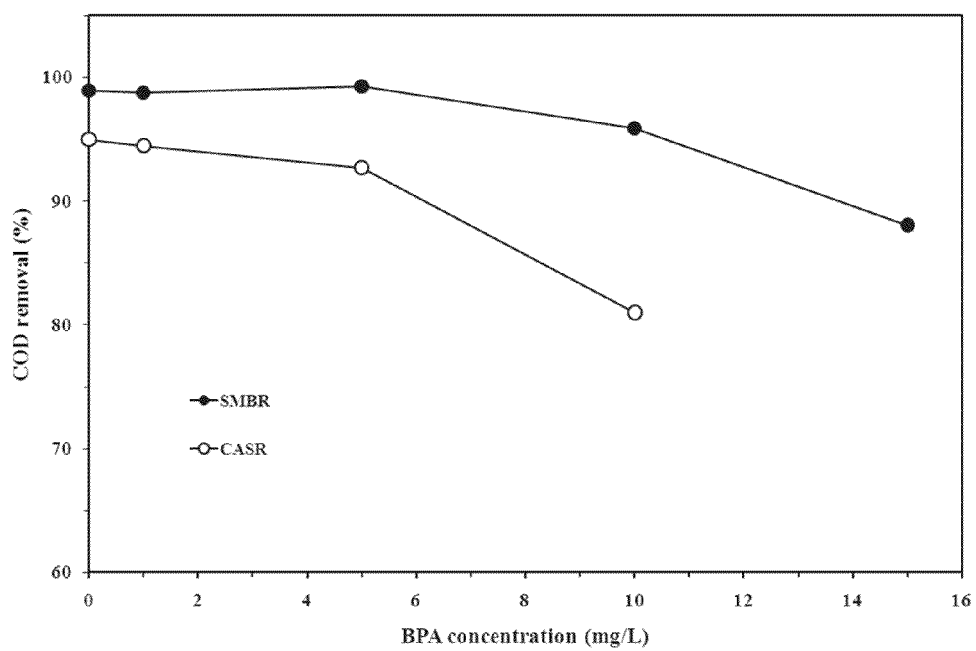
FIG. 8 illustrates a graph showing effect of BPA concentration in municipal wastewaters on COD removal for SMBR system according to an embodiment of the present invention and a CASR system.

The performance of the SMBR and CASR in removing COD from a synthetic municipal wastewater contaminated by BPA is evaluated. After the start-up of the SMBR for a period of time of 74 days where the system is fed with the SMWW containing glucose as biodegradable organic substrate (400-2000 mg/L of COD) as mentioned above, the biomass (VSS=16 g/L) is then acclimatized to BPA oxidation. For that, BPA has been gradually added (1.0 to 15 mg/L), while the COD is maintained around 1000 mg/L with HRT of 6 h. COD is first chosen as the principal parameter to define effluent treatment as analysis of BPA may be laborious. To compare the efficiency of SMBR system, a CASR is operated with similar conditions. From FIG. 8, it can be seen that, the performance of membrane bioreactor in terms of COD removal remained constant and reached 99% while BPA concentrations in raw effluent ranged between 1.0-5.0 mg/L. By comparison, 81 to 94% of COD removal is recorded while using conventional activated sludge system. Residual COD concentration measured at the outlet of SMBR is ≤30 mg $O_2$/L, similar to that recorded in the absence of BPA in the synthetic wastewater. For BPA concentration higher than 5.0 mg/L, the performance of both reactors in terms of COD removal decreased, and BPA became toxic for the bacterial activity and high residual concentration of COD (COD>30 mg/L) was measured in the treated effluent, indicating a decrease in the purification performance of the reactors. However, SMBR is more effective than CASR. A decrease of biomass concentration is also recorded and VSS concentration decreased from 15.9 to 14.8 g/L. As shown in the data of Tables 1 and 9, the limit of the toxicity (21.6 g BPA/$m^3$/d or 1.52 g BPA/kg VSS/d at 5 mg BPA/L, 43.2 g BPA/$m^3$/d or 3.04 g BPA/kg VSS/d at 10 mg BPA/L, 63.8 g BPA/$m^3$/d or 4.56 g BPA/kg VSS/d at 15 mg BPA/L, 86.4 g BPA/$m^3$/d or 6.17 g BPA/kg VSS/d at 20 mg BPA/L and about 108 g BPA/$m^3$/d or 7.71 g BPA/kg VSS/d at 25 mg BPA/L) determined for the bioreactor membrane system are higher than that recorded for the conventional activated sludge (2.5 g BPA/$m^3$/d or 0.29 g BPA/kg VSS/d and 5.0 g BPA/$m^3$/d or 0.58 g BPA/kg VSS/d at 5 and 10 mg BPA/L). Volumetric loading above the limit of toxicity of about 108 g BPA/$m^3$/d, the toxic effect of the bisphenol compound progressively decreases the purification performance of the process and bioreactor because of the inhibition of the biomass therein.

TABLE 1

Effect of volumetric and Organic loadings on the percentage of COD removal from synthetic municipal wastewater (SMWW) contaminated by BPA; initial concentration of COD = 1000 mg/L.

| BPA (mg/L) | SMBR[a] | | | CASR[b] | | |
|---|---|---|---|---|---|---|
| | Volumetric loading (g BPA/m³/d) | Organic loading (g BPA/ kg VSS/d) | COD removal (%) | Volumetric loading (g BPA/m³/d) | Organic loading (g BPA/ kg VSS/d) | COD removal (%) |
| 0.0 | 0.0 | 0.00 | 99.0 | 0.0 | 0.00 | 95.0 |
| 1.0 | 4.32 | 0.30 | 98.8 | 0.5 | 0.06 | 94.5 |
| 5.0 | 21.6 | 1.52 | 99.3 | 2.5 | 0.29 | 92.7 |
| 10.0 | 43.2 | 3.04 | 95.9 | 5.0 | 0.58 | 81.0 |
| 15.0 | 63.8 | 4.65 | 88.1 | — | — | — |

[a]SMBR = Submerged membrane bioreactor system
[b]CASR = Conventional activated sludge reactor The Influence of HRT on COD removal is evaluated as shown in Table 2. The COD concentrations in the wastewater are kept constant, and HRT is gradually shortened from 6.0, 5.0, 4.5 and 4.0 h. The COD concentrations in the treated water remain low and nearly constant. These results demonstrated that HRT does not influence the COD removal in wastewater containing BPA, because of high biomass concentration in the SMBR.

TABLE 2

Effect of hydraulic retention time (HRT) on the percentage of COD removal from synthetic municipal wastewater (SWW) contaminated by BPA ($[CON]_i$ = 1,000 mg/L).

| Test | Duration (d) | HRT (h) | Flux (L/m³·h) | COD removal (%) | $[COD]_f$ (mg $O_2$/L) |
|---|---|---|---|---|---|
| 1 | 5 | 5.5 | 22.97 | 99.0 | 10 |
| 2 | 5 | 5.0 | 25.53 | 98.4 | 16 |
| 3 | 5 | 4.5 | 28.08 | 98.4 | 16 |
| 4 | 5 | 4.0 | 31.91 | 98.0 | 20 |

Figure 9:
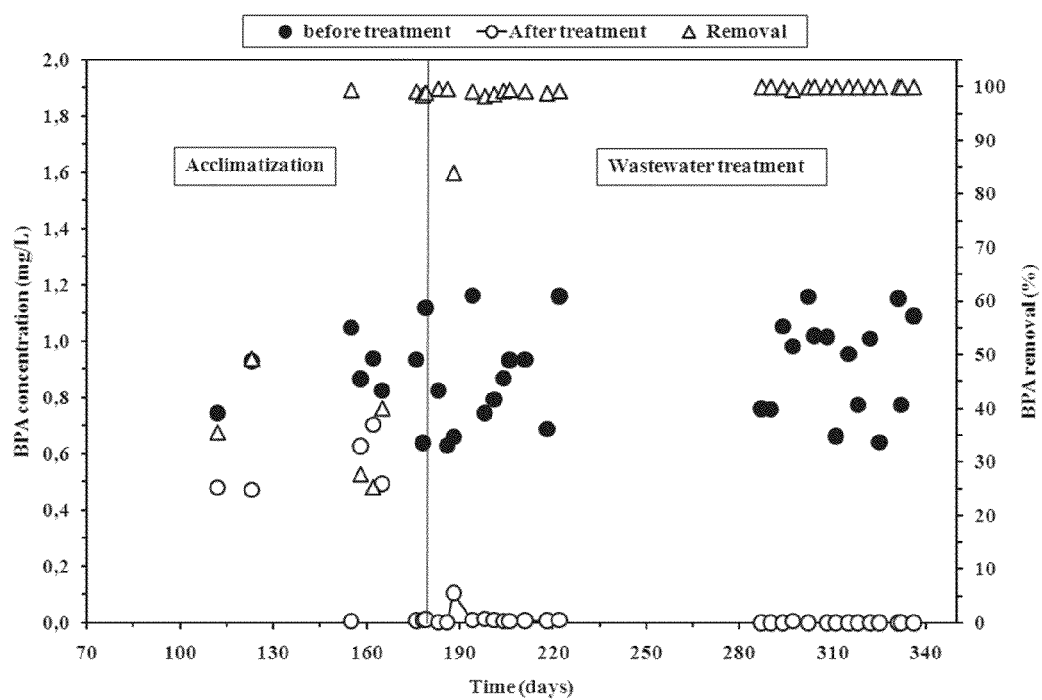
FIG. 9 illustrates a graph showing variation of residual concentration of BPA measured at the inlet (raw water) and outlet (filtrate) of an SMBR system according to an embodiment of the present invention during the treatment of synthetic municipal wastewater (SMWW)

Performance of the SMBR in removing BPA from the SMWW is evaluated. Once the limit of the toxicity is determined, BPA concentration is maintained constant around 1.0 mg/L in SMWW, which corresponded to a volumetric BPA loading of 4.32 g/m³/d for SMBR and 0.5 g/m³/d for CASR. FIG. 9 shows the changes in BPA concentration as a function of treatment time, wherein the performance of the SMBR on BPA removal from SMWW is investigated from the 176th day for a period of time of 156 days (until the 331th day). An average yield of BPA degradation of 99% is measured at the outlet of SMBR and the residual concentration of BPA in treated-effluent varies from 0.0023 to 0.0126 mg/L. Different plausible mechanisms for organic compound removal such as volatilization, adsorption and degradation could be used to describe the micro-pollutant removal in membrane bioreactors. However, in the case of BPA, volatilization is negligible due to its low vapor pressure of 5.3 mPa. In our experimental conditions, BPA removal is mainly due to adsorption and biodegradation transformation processes, as explained below in more detail. Likewise, residual BPA concentrations recorded in mixed liquor remains low (0.017 to 0.004 mg/L), indicating that BPA is not accumulated in the SMBR, but it is oxidized by bacteria as shown in the data of Table 3.

TABLE 3

Residual concentration of BPA in the sludge liquor compared to those measured at the inlet and outlet of SMBR; initial concentration of COD = 1000 mg/L; HRT = 6 h.

| BPA concentration in the raw effluent (mg/L) | BPA concentration in the sludge liquor (mg/L) | BPA concentration at the outlet (in the filtrate) (mg/L) |
|---|---|---|
| 0.6292 | 0.0040 | 0.0023 |
| 1.1626 | 0.0110 | 0.0098 |
| 0.9331 | 0.0170 | 0.0050 |

It is worth noting that the recovery rate of extraction and cleanup methods are 91.5% for liquid samples and 75% for sludge samples. Limit of detection (LD) of the LC-MS/MS method was 0.005 mg/L.

The performance of the SMBR in removing TSS, $NH_4$—N and $PO_4$—P from a synthetic municipal wastewater contaminated by BPA is evaluated. Initial nitrogen concentrations ($NH_4$—N) in the SMWW ranged from 17.3 to 69.4 mg/L. After treatment, the residual ammonia concentration remained inferior to 0.1 mg/L (99% of $NH_4$—N removal), indicating that SMWW has been deeply nitrified in the SMBR as shown by the data of Table 4. The total retention of the biomass by means of the membrane contributed to the development of microorganisms having long generation times such as the autotrophic nitrifier population as previously reported by Vandevenne L. in GIRH/TEC202 (2007).

TABLE 4

Effectiveness of SMBR in removing $NH_4$—N and $PO_4$—P from the SMWW contaminated by BPA (1.0 mg/L); $[COD]_i$ = 1000 mg/L; HRT = 6 h.

| Parameters | Effluents | | Removal (%) |
|---|---|---|---|
| | Untreated | Treated | |
| $NH_4$—N (mg/L) | 17-69 | <0.1 | >99 |
| $PO_4$—P (mg/L) | 16-25 | 5.5-9.1 | 46-75 |

Initial phosphate concentrations ($PO_4$—P) in the SMWW ranges from 16 to 24.6 mg/L. After treatment, the residual phosphate concentrations ranged between 5.5 and 9.1 mg/L with an average yield of $PO_4$—P removal of 60% as shown in Table 4 above. As expected, SMBR is only operated in aerobic conditions and in these conditions, phosphate accumulating organisms (PAO) cannot grow very well as previously reported by Xing et al. J. Membr. Sci., 177 (2000): 73-82. It is the reason for which phosphate is middlingly removed. On the other hand, suspended solid is not detected in the treated-effluent (filtrate), regardless of the changes of the total suspended solids concentrations in the sludge liquor. Since TSS removal rate is higher than 99.9%, SMBR is a total barrier for TSS and turbidity is remained constant (lower than 1 NTU).

Figure 10:
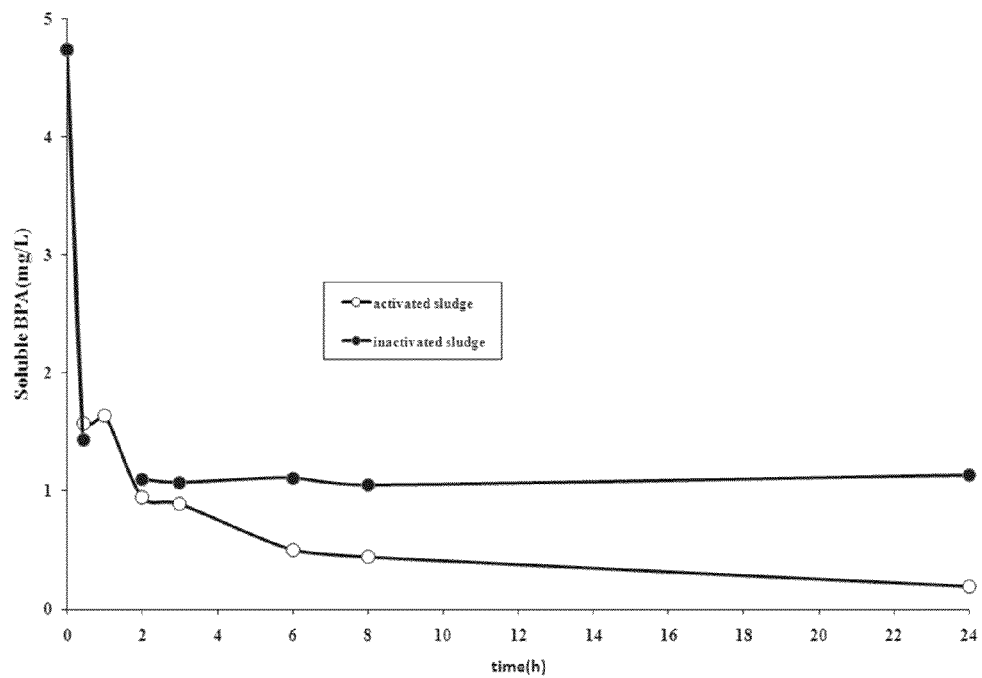
FIGS. 10 and 11 illustrate graphs showing evolution of BPA concentration in liquid phase for activated and inactivated sludge, after adding initial concentration of 5 and 10 mg BPA/L, respectively.
Figure 11:
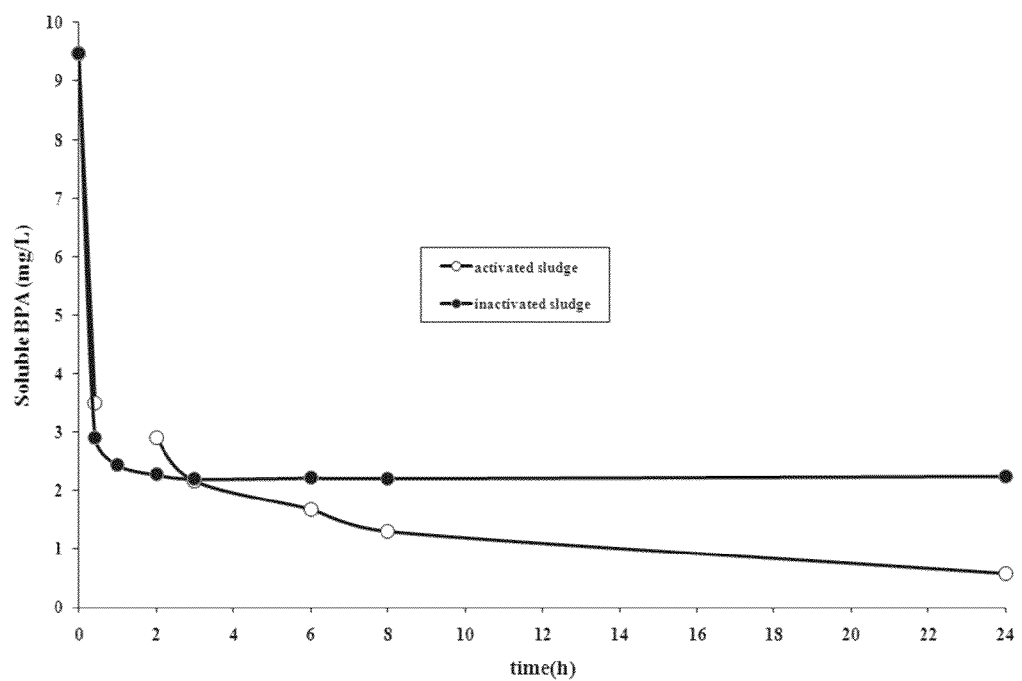

Adsorption tests on SMBR sludge are carried out in order to study the mechanisms of the biological removal of BPA (adsorption on the biomass versus biological oxidation). Adsorption tests are carried out on activated and inactivated sludge in order to distinguish physical sorption from bio-sorption process. The changes in residual BPA concentrations in the liquid phase during the treatment are presented in FIGS. 10 and 11. The BPA concentration decreased rapidly over the first 2 h of the treatment (a relatively high slope) and then, decreased slightly (low slope) and remained quite stable until the end of experiment using activated sludge. By comparison, in the case of non-activated sludge, only two regions could be distinguished in the (residual BPA, time) plane: a rapid decrease followed by a steady state. The comparison of both curves, using either initial concentration of 5.0 or 10 mg/L, shows that the first part of the graph (rapid decrease with a relatively high slope) corresponds to the physical sorption of the pollutant on sludge, whereas the slight decrease observed in the case of activated sludge sample corresponds to the bio-sorption (or biodegradation) of the pollutant. The physical sorption is high over the first 30 min and an average of 69% of BPA is removed. The adsorption of the pollutant on the biomass is an important step for biodegradation process, as reported in prior literature. However, Chen et al. Process Biochem. 43 (2008) 451-456" obtained 30 min of equilibrium adsorption time in a submerged membrane bioreactor process, while Clara et al. Chemosphere 56 (2004) 843-851, obtained 2 h of BPA adsorption equilibrium time in conventional activated sludge reactor.

Thermodynamic equilibrium constants are determined in order to evaluate adsorption affinity of BPA on sludge. The amount of BPA adsorbed on sludge is calculated using the following equation (Eq. (10)):

$$q_e = \frac{(C_0 - C_e) * V}{M} \quad (10)$$

where:
$q_e$ (mg/g) is the amount of BPA adsorbed on sludge;
$C_0$ and $C_e$ (mg/L) are the initial and equilibrium liquid phase concentrations of BPA, respectively;
V (L) represents the volume of sludge solution; and
M (g) represents the mass of the dried sludge.

Adsorption removal of BPA on sludge varied from 70.5 to 85.7% of initial BPA liquid phase concentration. It decreased with the increase of initial BPA concentration in liquid phase as shown from the data of Table 5.

TABLE 5

Evolution of adsorption capacity of BPA on sludge versus initial BPA liquid phase concentration.

| Initial BPA concentration in liquid phase ($C_0$, mg/L) | Equilibrium liquid phase concentration of BPA ($C_e$, mg/L) | Adsorbed fraction (%) |
|---|---|---|
| 0.45 | 0.07 | 84.4 |
| 0.91 | 0.13 | 85.7 |
| 1.82 | 0.39 | 78.6 |
| 4.74 | 1.09 | 77.0 |

TABLE 5-continued

Evolution of adsorption capacity of BPA on sludge versus initial BPA liquid phase concentration.

| Initial BPA concentration in liquid phase ($C_0$, mg/L) | Equilibrium liquid phase concentration of BPA ($C_e$, mg/L) | Adsorbed fraction (%) |
|---|---|---|
| 9.47 | 2.27 | 76.0 |
| 13.67 | 3.45 | 74.8 |
| 18.22 | 5.37 | 70.5 |

Figure 12:
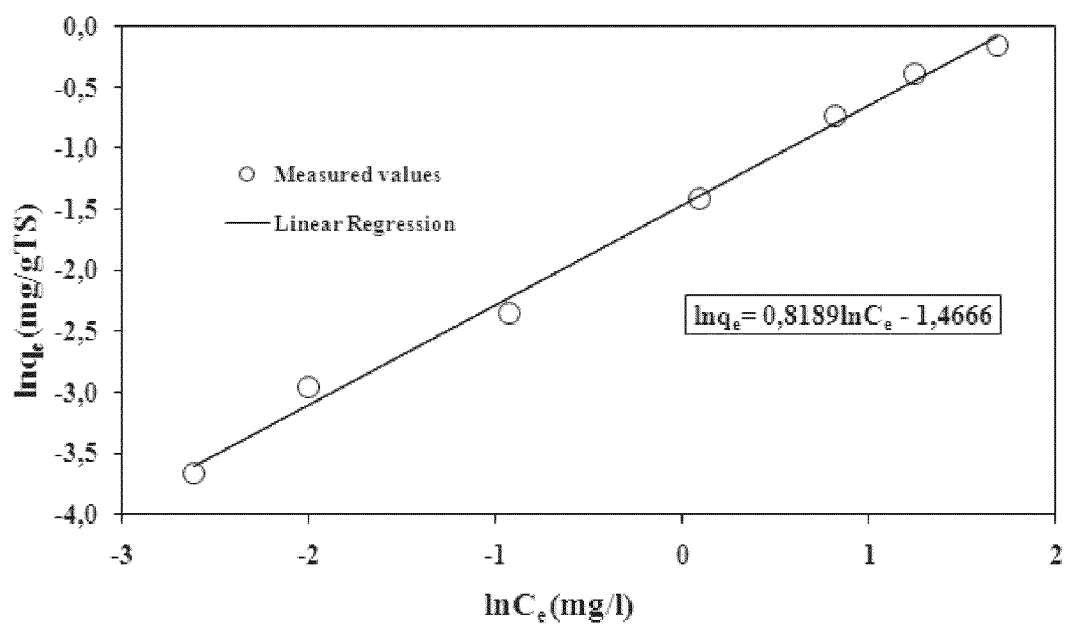
FIG. 12 illustrates a graph showing equilibrium of adsorption of BPA on inactivated sludge with linearization according to Freundlich equation.

Adsorption isotherms allow presenting the variation of sorption with respect to the concentration of sorbate in the bulk solution at constant temperature. Equilibrium adsorptions of BPA on the biomass using Freundlich and Langmuir models are studied. These isotherms describe BPA uptake per unit weight of sorbent ($q_e$) in function of the equilibrium sorbate concentration in the bulk solution ($C_e$). The Freundlich isotherm is described by the following equation (Eq. (11)) and is illustrated in FIG. 12:

$$\mathrm{Ln}q_e = \mathrm{Ln}K_F + \frac{1}{n}\mathrm{Ln}C_e \quad (11)$$

where:
$K_F$ is the Freundlich isotherm constant related to the adsorption capacity; and
n describes the adsorption intensity.

The Freundlich equation is valid for heterogeneous sorption on a surface of sludge containing several sites, as reported by Schmuhl et al Water SA, 27(1) (2001): 1-47, and by Huang et al. as cited above. When n=1, the adsorption is linear. For n<1, the adsorption bond is high, whereas for n>1, the adsorption bond is weak, as reported by Jiang et al, Chemosphere 47 (2002) 711-716.

The value of Freundlich coefficient log $K_f$ recorded in the experiments is −0.637, which is similar to −0.614 recorded by Clara et al. as cited above. The value of Freundlich constant n recorded is 1.22. This value is included in the range $1 \leq n \leq 10$, indicating that adsorption bond may be weak, in accordance to Shokoohi et al. in Iran. J. Environ. Health. Sci. Eng. 6 (2) 107-114. Log $K_D$ (equilibrium distribution coefficient) varied from 2.00 to 2.75 L.kg$^{-1}$, which is quite similar to the values (1.89 and 2.41 L.kg$^{-1}$) recorded by Clara et al. and those measured (2.00 to 2.75 L. kg$^{-1}$ TS) by Chen et al. as cited above and that (2.56 kg$^{-1}$) measured by Zhao et al. as cited above, at low BPA range concentration range (20-100 µg L$^{-1}$) in conventional activated sludge.

Figure 13:
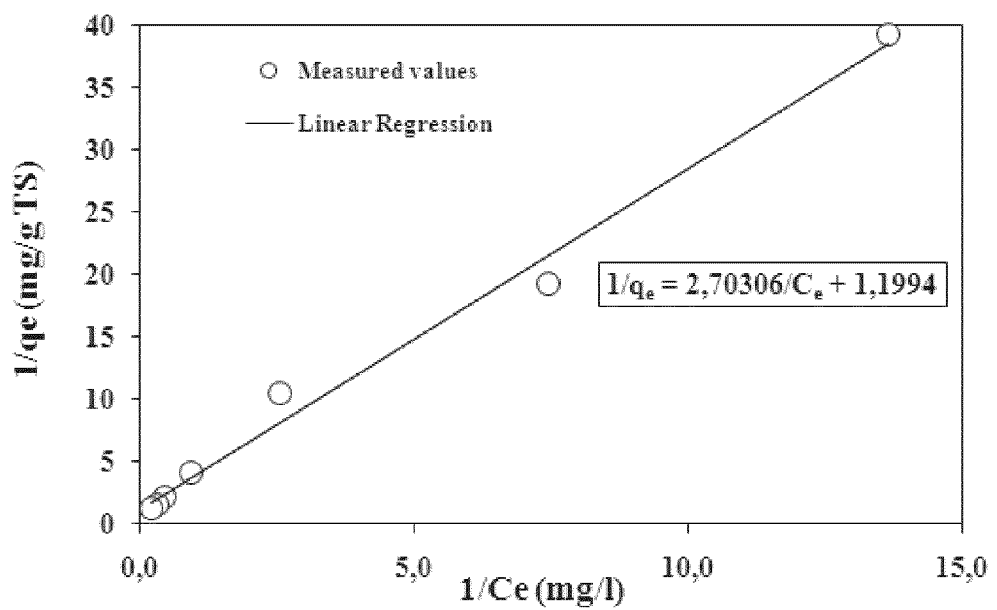
FIG. 13 illustrates a graph showing equilibrium of adsorption of BPA on inactivated sludge with linearization according to Langmuir equation.

The Langmuir isotherm is described by the following equation (Eq. (12)) and is represented in FIG. 13:

$$q_e = \frac{K_L \cdot C_e}{1 + bC_e} \quad (12)$$

In fact, Langmuir adsorption isotherm is valid for monolayer sorption on a surface containing a limited number of sites, predicting a homogenous distribution of sorption energy. The reorganization of Eq. (12) leads to the following equation (Eq. (13)) as the linearised form of the Langmuir isotherm:

$$\frac{C_e}{q_e} = \frac{b}{K_L}C_e + \frac{1}{K_L} \qquad (13)$$

where $k_L$ and b are the Langmuir constants.

The constant "b" in the Langmuir equation is related to the net enthalpy of the sorption process. The values of "$K_L$" and "b" are obtained from the straight line curve: $K_L=0.370$ L g$^{-1}$ and b=0.444 L mg$^{-1}$. The maximum BPA concentration ($q_m$) capable of being adsorbed on sludge can be determined by calculating the ratio $K_L/b$, which value is estimated to 0.833 mg g$^{-1}$.

From Langmuir isotherm, it is possible to define a dimensionless constant ($R_L$) taking into account the separation factor of equilibrium parameter. This dimensionless constant allows predicting if the adsorption system is favorable or not, as explained in Shokoohi et al. as cited above and by Gao et al. Journal of Fluorine Chemistry 130 (2009) 1035-1041. $R_L$ can be evaluated using the following equation (Eq. (14)):

$$R_L = \frac{1}{1+bC_0} \qquad (14)$$

When $R_L>1$, the adsorption process is unfavorable, whereas it is favorable when the value varies in the range $0<R_L<1$. For $R_L$ value very close to 0.0, the adsorption process is considered as irreversible, and it is considered as a linear process when $R_L$ is equal to 1.0, as explained in Shokoohi et al. and Gao et al., as well as by Langmuir, J. Am. Chem. Soc. 40 (1918) 1361-1403.

The $R_L$ value recorded (0.11) in the experiments is less than 1 and higher than 0.0, indicating that Langmuir model is favorable for describing BPA adsorption. The isotherm types and parameters values can be compared to those recorded by Clara et al. which studied a conventional activated sludge reactor for BPA removal from wastewater (F/M ratio of 0.01 kg BOD kg TSS L$^{-1}$ d$^{-1}$). The small floc size (10-100 μm), as discussed by Zhang et al. Water Sci. Technol. 35 (1997) 37-44, as well as specific sludge composition in MBR does not change (decrease or increase) significantly the contact capacity (specific adsorption surface) of sludge. This may indicate that adsorption process of BPA occurred in SMBR is quite similar to that observed in CASR regardless of the characteristics of sludge, as observed by Chen et al. as cited above in a comparative study between SMBR and CASR.

The data obtained from the Freundlich and Langmuir equations are summarized in Table 6.

TABLE 6

Langmuir and Freundlich isotherm parameters.

| Isotherms | Equations | Parameters | Values | $R^2$ |
|---|---|---|---|---|
| Langmuir | $q_e = \dfrac{K_L \cdot C_e}{1+bC_e}$ | $q_m$ (mg g$^{-1}$) | 0.833 | 0.990 |
| | | b (L mg$^{-1}$) | 0.444 | |
| | | $K_L$ (L g$^{-1}$) | 0.370 | |
| | | $R_L$ | 0.110 | |
| Freundlich | $q_e = k_f C_e^{1/n}$ | $k_f$ (mg$^{1-1/n}$ g$^{-1}$ · L$^{1/n}$) | 0.231 | 0.995 |
| | | log $k_f$ | −0,637 | |
| | | n | 1.22 | |
| | | $\dfrac{1}{n}$ | 0.819 | |

Figure 14:
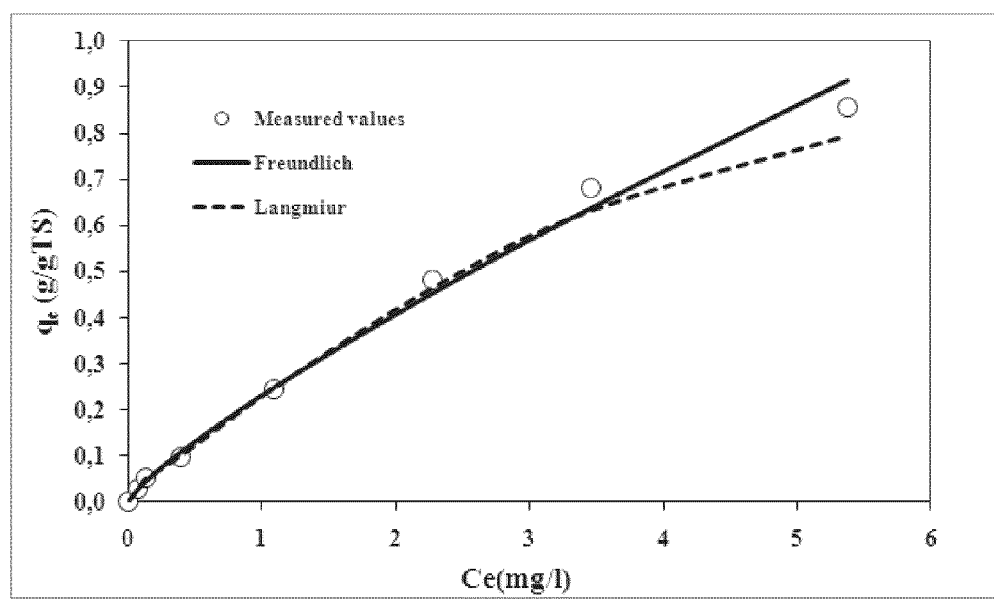
FIG. 14 illustrates a graph showing adsorption isotherms of BPA on inactivated sludge.

Considering the correlation coefficients ($R^2=0.995$ for Freundlich model and $R^2=0.990$ for Langmuir model, it can be seen that the two models describe well the adsorption phenomenon over the entire BPA concentration range studied, as shown on the graph of FIG. 14. However, Freundlich equation fitted the data better than the Langmuir equation.

Adsorption kinetic allows controlling the efficiency of the process and can be helpful to understand the mechanisms of the sorption process. To evaluate the sorption rate, the kinetic data are modeled using pseudo-first order and pseudo-second order equations. The kinetic models parameters are estimated by regression analysis method using Excel™ software. In accordance with Lagegren as cited above and with Bhattacharya et al., J. Env. Eng. ASCE 110 (1984) 110-122, pseudo-first order chemical sorption is described by the following equation (Eq. (15)):

$$\frac{dq_t}{dt} = k_1(q_e - q_t) \qquad (15)$$

where:

$k_1$ is the equilibrium rate constant of pseudo-first order (L min$^{-1}$);

$q_e$ (mg g$^{-1}$) is the amount of BPA adsorbed at equilibrium; and $q_t$ (mg g$^{-1}$) is the amount of BPA adsorbed at any time.

This model is based on the assumption that the rate is proportional to the number of free sites. Integrating Eq. (15) with boundary conditions $q_t=0$ at t=0 and $q_t=q_t$ at t=t gives (Eq. (16)):

$$\ln(q_e - q_t) = \ln q_e - k_1 t \qquad (16)$$

Figure 15:
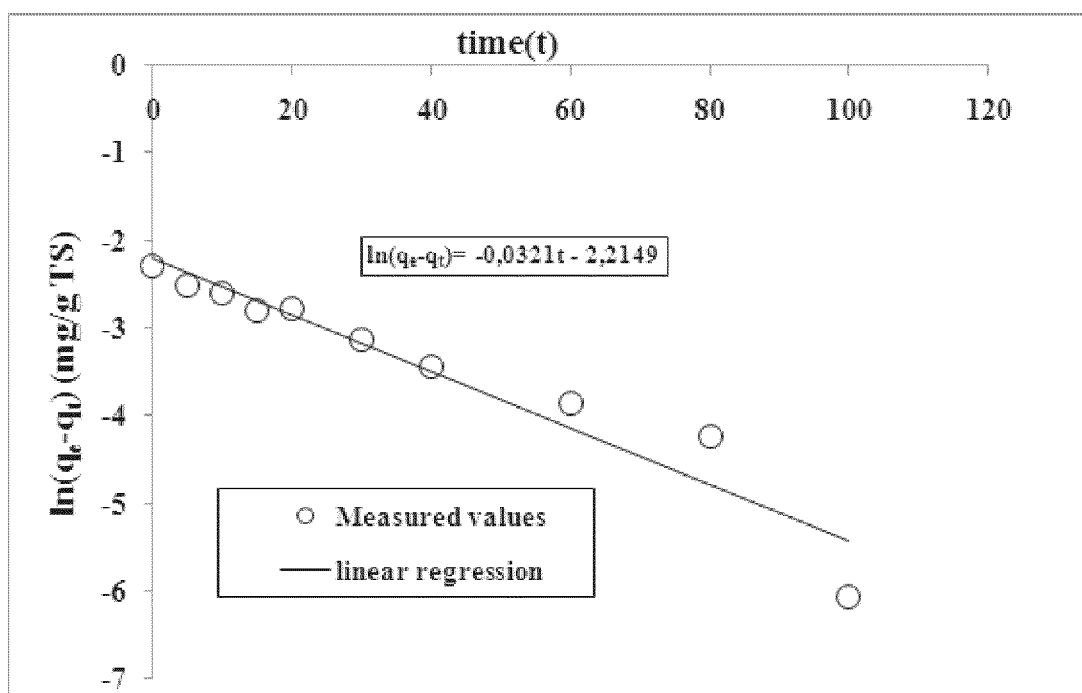
FIG. 15 illustrates a graph showing kinetic of BPA removal with linearization according to first-order equation.

The values of $k_1$ and $q_e$ are obtained from the slope and intercept of the plot of $\ln(q_e - q_t)$ versus t, respectively as shown on the graph of FIG. 15.

In accordance with Ho et al. as cited above, for the rate constant of pseudo-second order chemical sorption, the following equation (Eq. (17)) has been also applied:

$$\frac{dq_t}{dt} = k_2(q_e - q_t)^2 \qquad (17)$$

where, $k_2$ (g mg$^{-1}$ g$^{-1}$) is the equilibrium rate constant of pseudo-second order;

$q_e$ (mg g$^{-1}$) is the amount of BPA adsorbed at equilibrium; and $q_t$ is the amount of BPA adsorbed at time t (mg g−1).

After integration and rearrangement using boundary conditions ($q_t=0$ at t=0 and $q_t=q_t$ at t=t) the Eq. (17) becomes (Eq. (18)):

$$\frac{t}{q_t} = \frac{1}{k_2 q_e^2} + \frac{1}{q_e}t \qquad (18)$$

Figure 16:
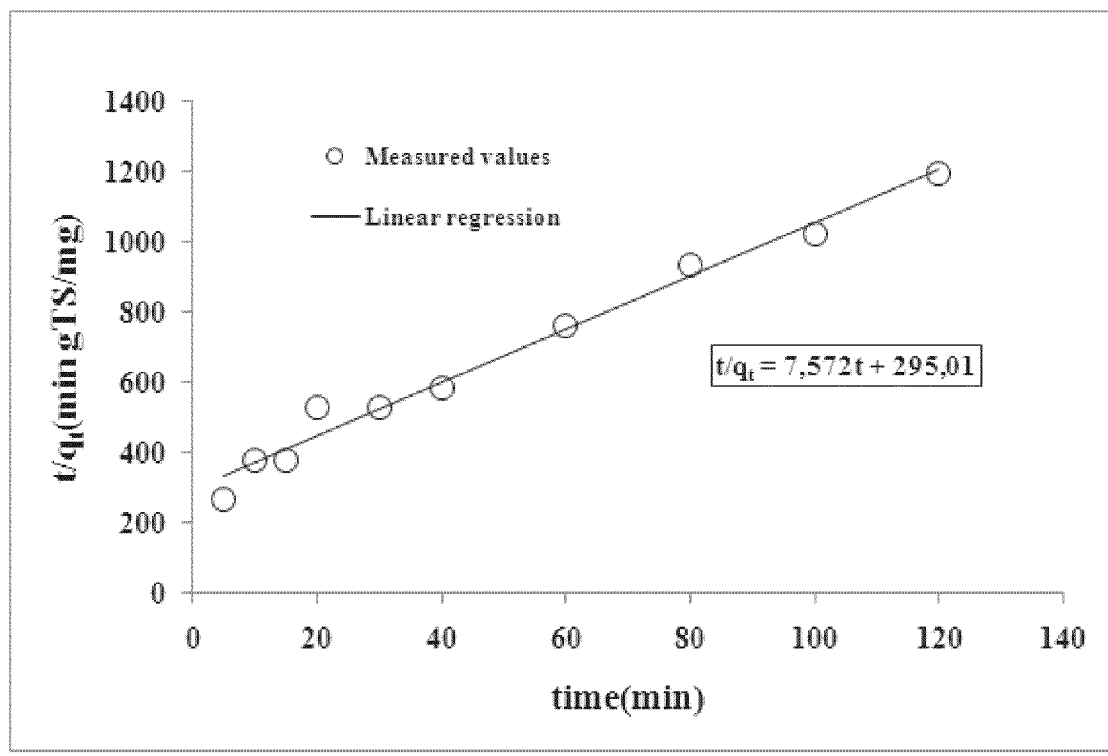
FIG. 16 illustrates a graph showing kinetic of BPA removal with linearization according to second-order equation.

The values of $k_2$ and $q_e$ are obtained from the slope and intercept of the plot of 1/qt versus t, respectively, as shown on the graph of FIG. 16.

A third model, known as Elovich model described in Low et al. cited above, has been applied using the following equation (Eq. (19)):

$$\frac{dq_t}{dt_t} = ae^{-\alpha q_t} \quad (19)$$

where $q_t$ is the amount of BPA adsorbed on sludge at any time t;

a and α are constants, a being related to the initial velocity of the adsorption process.

After integration and rearrangement (using boundary conditions $q_t=0$ at $t=0$ and $q_t=q_t$ at $t=t$), Eq. (19) becomes (Eq. (20)):

$$q_t = \frac{1}{\alpha}\ln(1 + \alpha at) \quad (20)$$

If an amount ($q_0$) of adsorbate is instantaneously adsorbed, after integration equation Eq. (20) becomes (Eq. (21)):

$$q_t = \frac{1}{\alpha}\ln(\alpha at + e^{\alpha q_0}) \quad (21)$$

Values obtained for the various equation parameters are summarized in Table 7.

TABLE 7

Kinetic adsorption parameters

| Order | Equations | Parameters | Values | R2 |
|---|---|---|---|---|
| Pseudo-first Order (Lagergren, 1898) | $\frac{dq_t}{dt} = k_1(q_e - q_t)$ | $q_e$ (mg g$^{-1}$)<br>$k_1$ (min$^{-1}$) | 0.109<br>0.032 | 0.926 |
| Pseudo-second (Ho et McKay, 1999) | $\frac{dq_t}{dt} = k_2(q_e - q_t)^2$ | $q_e$ (mg g$^{-1}$)<br>$k_2$ (g mg$^{-1}$ min$^{-1}$) | 0.132<br>0.194 | 0.983 |
| Elovich (Low, 1960) | $\frac{dq_t}{dt} = ae^{-\alpha q_t}$ | α (g mg$^{-1}$)<br>α (mg g$^{-1}$ min$^{-1}$)<br>$q_0$ (mg g$^{-1}$) | 24.98<br>0.0040<br>0.0013 | 0.989 |

Figure 17:
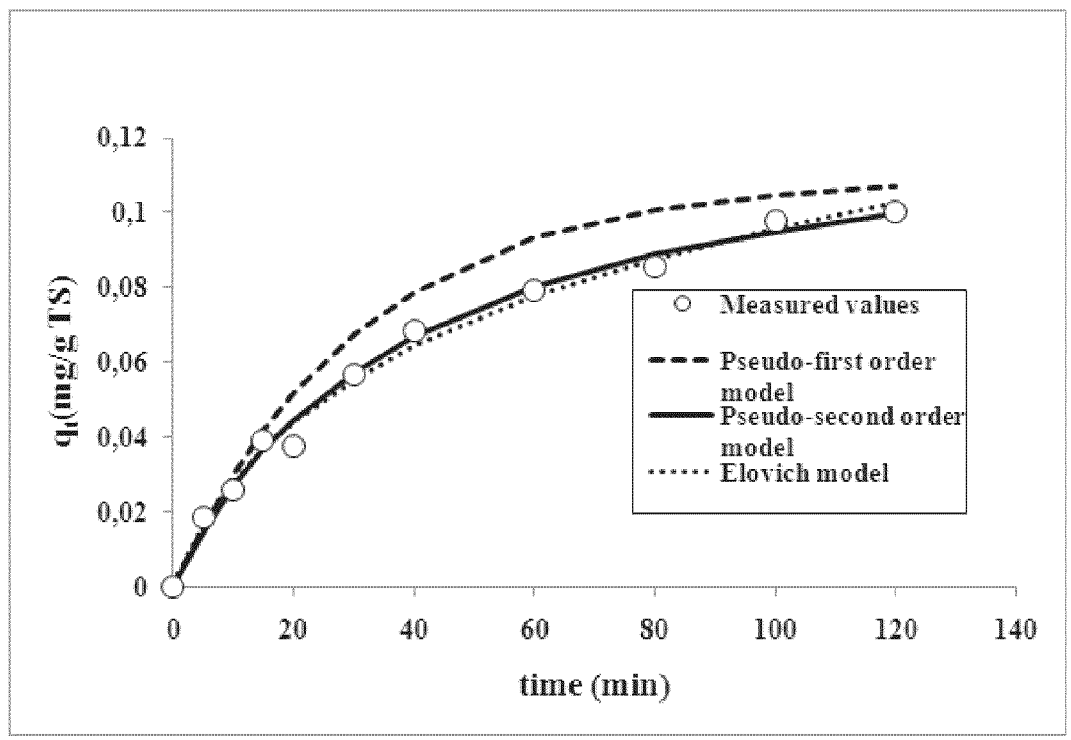
FIG. 17 illustrates a graph showing a comparison of different kinetics of BPA removal.

FIG. 17 shows the plots of the different kinetic models. The best-fitting model is selected according to regression correlation coefficient value, $R^2$. Higher correlation coefficients are obtained for pseudo-second-order ($R^2=0.983$) and Elovich ($R^2=0.989$) kinetic models. However, Elovich equation fitted the data better than the pseudo-second equation. A very small amount $q_0$ of BPA is instantaneously adsorbed when BPA is put in contact with sludge. The value of $q_0$ is 0.0013 mg g$^{-1}$, which represented only 1.2% of the amount of BPA adsorbed at equilibrium ($q_e$). Kinetic constant $k_2$ is 0.194 g mg$^{-1}$min$^{-1}$.

In order to calculate whether the adsorption process is spontaneous or not, thermodynamics parameters including standard Gibbs free energy of adsorption ($\Delta_{ad}G^0$), standard enthalpy of adsorption ($\Delta_{ad}H^0$) and standard entropy change of) adsorption ($\Delta_{ad}S^0$) have been considered. $\Delta_{ad}G^0$ is calculated using the following equation (Eq. (22)):

$$\Delta_{ad}G^0 = -RT \ln K_d \quad (22)$$

where:

R is the universal gas constant (8.314 J mol$^{-1}$ K$^{-1}$);

T is the temperature (K), and $K_D$ is the specific adsorption coefficient (equilibrium distribution coefficient). Relation between $\Delta_{ad}G^0$, $\Delta H^0$ and $\Delta_{ad}S^0$ is expressed by the following equation (Eq. (23)):

$$\Delta_{ad}G^0 = \Delta_{ad}H^0 - T\Delta_{ad}S^0 \quad (23)$$

Eq. (22) can be written as follows (Eq. (24)):

$$\ln K_D = \frac{\Delta_{ad}S^0}{R} - \frac{\Delta_{ad}H^0}{RT} \quad (24)$$

wherein $\Delta_{ad}H^0$, $\Delta_{ad}S^0$ are calculated from the slope and intercept of the plot of ln $K_D$ versus 1/T, respectively.

The adsorption tests are conducted at different temperatures ranging from 293 K to 313 K. At each temperature, the corresponding $K_D$ at fixed initial concentration of BPA is calculated and the corresponding Gibbs free energy change is deducted according to Eq. (22). The values of thermodynamic parameters are summarized in Table 8.

TABLE 8

Thermodynamic parameters

| Temperature (K) | $K_D$ | $\Delta_{ad}G^0$(KJ mol$^{-1}$) | $\Delta_{ad}H^0$(KJmol$^{-1}$) | $\Delta_{ad}S^0$(KJmol$^{-1}$K$^{-1}$) |
|---|---|---|---|---|
| 293 | 19.19 | -7.197 | | |
| 303 | 3.315 | -3.019 | -82.121 | -0.257 |
| 313 | 2.260 | -2.120 | | |

Gibbs free energy change is negative at each temperature, indicating spontaneous nature of the adsorption process. This result confirmed the instantaneous value of adsorbed BPA recorded above with Elovich model. Gibbs free energy change (in absolute value) decreased when temperature increased, indicating that adsorption is favorable at low temperatures, and the negative value of $\Delta_{ad}H^0$ (−82.121 K J mol$^{-1}$) showed that BPA adsorption onto sludge is exothermic. Low Enthalpy value ($\Delta_{ad}H^0<200$ KJ mol$^{-1}$) indicated that during adsorption process, very low interactions between BPA and sludge occurred, such as Van Der Waals attraction and electrostatic strengths. These results indicated that the adsorption process is of a physical nature. Negative value of entropy change suggests that randomness decreased on the system during BPA adsorption, and BPA structured on the solid-liquid interface.

The performances of a hollow-fiber submerged membrane bioreactor for BPA removal is demonstrated. BPA is effectively removed (abatement 98%) from a synthetic municipal wastewater containing initial concentration of COD varied from 400-2000 mg/L using glucose as initial substrate. However, from a certain level of BPA concentration around 5.0 mg/L (21.6 g BPA/m$^3$/d), it became toxic for the bacterial activity.

The results of the experiments demonstrated that the sorption of BPA on the biomass is an important step for biodegradation process. Langmuir and Freundlich isotherms described very well the process over the entire BPA concentration range studied (0.45-18.2 mg BPA L$^{-1}$). For instance, the applicability of the Langmuir isotherm for BPA allowed determining the adsorption rate constant ($K_L$=0.370 L g$^{-1}$) and the maximum adsorption capacity ($q_m$=0.833 mg g$^{-1}$). The Elovich kinetic model which takes into account the instantaneous sorption described very well the process. A low amount of BPA ($q_0$=0.0013 mg g-1) is instantaneously adsorbed while BPA is put in contact with sludge. The reaction rate constant for BPA removal using Elovich model is 0.194 g mg$^{-1}$ min$^{-1}$. Thermodynamic parameters have been also determined to describe the sorption process. Gibbs free energy decreased when temperature increased, indicating that the sorption is favorable at low temperatures, and the negative value of $\Delta_{ad}H^0$ (-82.121 K J mol$^{-1}$) showed that BPA adsorption onto sludge is an exothermic reaction. The relatively low enthalpy value ($\Delta_{ad}H^0$<200 KJ mol$^{-1}$) indicated that during adsorption process, very low interactions occurred between BPA and sludge, such as Van Der Waals attraction or electrostatic strengths.

TABLE 9

Effect of volumetric and organic loading rates on the percentage of COD removal from synthetic effluent (SE) contaminated by BPA

| | | SMBR | | | | |
|---|---|---|---|---|---|---|
| $[BPA]_i$ (mg/L) | Volumetric loading (g BPA/m$^3$ · d) | Organic loading (g BPA/kg VSS · d) | Residual BPA Conc. (mg/L) | Residual COD Conc. (mg O$_2$/L) | BPA removal (%) | COD removal (%) |
| 0.0 | 0.0 | 0.00 | — | ≤DL2-34.1 | — | 99.0 ± 0.6 |
| 5.0 | 21.6 | 1.54 | ≤DL1-0.0341 | ≤DL2-1.7 | 99.7 ± 0.4 | 99.9 ± 0.1 |
| 10 | 43.2 | 3.04 | ≤DL1-0.0219 | ≤DL2-10.6 | 99.9 ± 0.1 | 99.5 ± 0.5 |
| 15 | 63.8 | 4.56 | ≤DL1-0.0037 | ≤DL2-6.3 | 99.9 ± 0.01 | 99.6 ± 0.4 |
| 20 | 86.4 | 6.17 | ≤DL1 | ≤DL2-4.7 | 99.9 ± 0.01 | 99.8 ± 0.2 |
| 25 | 108.0 | 7.71 | N/A | N/A | N/A | N/A |

DL1 (Detection limit of BPA) = 0.0005 mg/L
DL2 (Detection limit of COD) = 1 mg O$_2$/L Now referring to Table 9 above, the effect of volumetric and organic loading are observed in a SMBR according to the present invention. The $[COD]_i$ is maintained at about 1,000 mg/L and the period of the tests ranged from 367$^{th}$ day to 416$^{th}$ day, Biomass concentration is 14 g VSS/L, with a HRT fixed at 6 h. Starting at 25 mg/L of BPA (at the entry of the SMBR) foam may be observed in the mixed liquor which is an indication of a perturbation in the bacterial activity in the SMBR.

TABLE 10

Evolution of COD and BPA in municipal wastewater spiked by BPA

| Parameters | Inlet concentration of SMBR (mg/L) | Outlet conc. of SMBR (in the filtrate) (mg/L) | Removal rate (%) |
|---|---|---|---|
| COD | 423-791 | 9.7-27.1 | 94.6-98.6 |
| BPA | 0.635-0.822 | ≤0.001 | ≥98.9 |

Limit of detection of BPA = 0.001 mg/L
Limit of detection of COD = 1 mg/L

Now referring to Table 10, the evolution of COD and BPA is evaluated on real wastewater effluents spiked with BPA. The HRT is fixed at 6 hours, the biomass concentration is 6.0 g VSS/L and the period of the tests ranged from 367$^{th}$ day to 416$^{th}$ day. The effluents are collected at a used water treatment plant, after the sand clean out and the large particle filtering units.

TABLE 11

Percentage of COD removal from synthetic effluent (SE) contaminated by BPA ($[COD]_i$ = 1,000 mg/L), Biomass concentration = 6.0 g VSS/L; HRT = 3 h; [BPA] = 1.0 mg/L

| Time | Inlet concentration (COD) mg/L | Outlet concentration (COD) mg/L | COD Removal (%) |
|---|---|---|---|
| 1$^{st}$ day | 926 | 40.1 | 95.6 |
| 2$^{nd}$ day | 1077 | 25.5 | 97.6 |
| 3$^{rd}$ day | 1059 | 21.6 | 98.0 |

Now referring to Table 11, the performance of the SMBR according to the present invention is evaluated by measuring the residual COD concentration in a synthetic effluent containing a concentration of 1 mg/L BPA. The hydraulic retention time measured is 3 hours and the period of the tests ranged from 367$^{th}$ day to 416$^{th}$ day. The results are complementary to the results shown in Table 2 above.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A process of reducing a bisphenol compound content of a wastewater using a membrane bioreactor containing a biomass in a volatile suspended solid (VSS) form, which comprises
operating continuously said membrane bioreactor to reduce bisphenol compound content to a residual concentration from about 0.0005 mg/L to about 0.0219 mg/L when said bisphenol compound volumetric load is from about 4.32 g m$^{-3}$ d$^{-1}$ to about 108 g m$^{-3}$ d$^{-1}$,
wherein said process is an aerobic process and wherein a hydraulic retention time of said membrane bioreactor is from about 3 hours to about 6 hours.

2. The process according to claim 1, wherein said volumetric load is from about 100 g m$^{-3}$ d$^{-1}$ to about 108 g m$^{-3}$ d$^{-1}$.

3. The process according to claim 1, wherein said biomass has a volatile suspended solid (VSS) concentration from about 1.5 g/L to about 19 g/L.

4. The process according to claim 3, wherein said biomass has a volatile suspended solid (VSS) concentration from about 10 g/L to about 15 g/L.

5. The process according to claim 1, wherein a chemical oxygen demand (COD) of about 500 to about 1500 mg/L is maintained in said membrane bioreactor.

6. The process according to claim 5, wherein said chemical oxygen demand (COD) is about 1000 mg/L.

7. The process according to claim 1, wherein said hydraulic retention time of said membrane bioreactor is about 6 hours.

8. The process according to claim 1, wherein an organic loading of said membrane bioreactor is from about 0.3 to about 2.1 kg COD/kg VSS/d.

9. The process according to claim 1, wherein said bisphenol compound content in said wastewater is up to about 10 mg/L.

10. The process according to claim 1, wherein said bisphenol compound content in said wastewater is from about 1 to about 25 mg/L.

11. The process according to claim 1, wherein said bisphenol compound content in said wastewater is from about 1 to about 20 mg/L.

12. The process according to claim 5, wherein said chemical oxygen demand (COD) is maintained with a source of carbon chosen from sodium acetate, peptone, glucose, saccharose, a starch, casein, sodium dodecyl sulfate, or combinations thereof.

13. The process according to claim 1, further comprising acclimatization of said biomass for oxidizing said bisphenol compound prior to operation of said membrane bioreactor for reducing said bisphenol compound content in said wastewater.

14. The process according to claim 13, wherein said acclimatization is by performing a gradual addition of said bisphenol compound over a time sufficient to obtain a biomass capable of oxidizing said bisphenol compound.

15. The process according to claim 14, wherein said gradual addition of said bisphenol compound is from about 1 mg/L to about 15 mg/L.

16. The process according to claim 1, wherein said bisphenol compound is chosen from 2,2-Bis(4-hydroxyphenyl)propane (bisphenol A), 1,1-Bis(4-hydroxyphenyl)-1-phenyl-ethane (bisphenol AP), 2,2-Bis(4-hydroxyphenyl)hexafluoropropane (bisphenol AF), 2,2-Bis(4-hydroxyphenyl)butane (Bisphenol B), Bis-(4-hydroxyphenyl)diphenylmethane (Bisphenol BP), 2,2-Bis(3-methyl-4-hydroxyphenyl)propane, Bis(4-hydroxyphenyl)-2,2-dichlorethylene, 1,1-Bis(4-hydroxyphenyl)ethane (Bisphenol E), Bis(4-hydroxydiphenyl)methane (Bisphenol F), 2,2-Bis(4-hydroxy-3-isopropyl-phenyl)propane (Bisphenol G), 1,3-Bis(2-(4-hydroxyphenyl)-2-propyl)benzene (Bisphenol M), Bis(4-hydroxyphenyl)sulfone (Bisphenol S), 1,4-Bis(2-(4-hydroxyphenyl)-2-propyl)benzene (Bisphenol P), 5,5'-(1-Methylethyliden)-bis[1,1'-(bisphenyl)-2-ol]propane (Bisphenol PH), 1,1-Bis(4-hydroyphenyl)-3,3,5-trimethyl-cyclohexane (Bisphenol TMC), 1,1-Bis(4-hydroxyphenyl)-cyclohexane (Bisphenol Z).

17. The process according to claim 1, wherein said bisphenol compound is 2,2-Bis(4-hydroxyphenyl)propane (bisphenol A).

18. A process of reducing a bisphenol compound content of a wastewater using a membrane bioreactor containing a biomass in a volatile suspended solid (VSS) form, comprising:
monitoring and regulating a bisphenol compound volumetric load from about 4.32 g m$^{-3}$ d$^{-1}$ to about 108 g m$^{-3}$ d$^{-1}$ to continuously reduce bisphenol compound content to a residual concentration from about 0.0005 mg/L to about 0.0219 mg/L in said bioreactor,
wherein said process is an aerobic process and wherein a hydraulic retention time of said membrane bioreactor is from about 3 hours to about 6 hours.

19. The process according to claim 18, wherein said monitoring and regulating is performed by measuring a concentration of said bisphenol compound of said wastewater and measuring the flow rate of said membrane bioreactor.

20. A membrane bioreactor containing a biomass in a volatile suspended solid (VSS) form, comprising:
a biomass capable of receiving a volumetric load from about 4.32 g m$^{-3}$ d$^{-1}$ to about 108 g m$^{-3}$ d$^{-1}$ of bisphenol compound content in a wastewater, for reducing said bisphenol compound content to a residual concentration from about 0.0005 mg/L to about 0.0219 mg/L in said wastewater,
wherein said membrane bioreactor is an aerobic membrane bioreactor and wherein a hydraulic retention time of said membrane bioreactor is from about 3 hours to about 6 hours.

21. The process according to claim 1, wherein said volumetric load is from about 21.6 g m$^{-3}$ d$^{-1}$ to about 108 g m$^{-3}$ d$^{-1}$.

22. The process according to claim 18, wherein said volumetric load is from about 100 g m$^{-3}$ d$^{-1}$ to about 108 g m$^{-3}$ d$^{-1}$.

23. The membrane bioreactor according to claim 20, wherein said volumetric load is from about 100 g m$^{-3}$ d$^{-1}$ to about 108 g m$^{-3}$ d$^{-1}$.

24. A process of reducing a bisphenol compound content of a wastewater using a membrane bioreactor containing a biomass in a volatile suspended solid (VSS) form, which comprises
operating continuously said membrane bioreactor to reduce bisphenol compound content to a residual concentration from about 0.0005 mg/L to about 0.0219 mg/L when said bisphenol compound volumetric load is from about 63.8 g m$^{-3}$ d$^{-1}$ to about 108 g m$^{-3}$ d$^{-1}$,
wherein said process is an aerobic process.

* * * * *